（12）United States Patent
Mihály et al.

(10) Patent No.: US 9,204,336 B2
(45) Date of Patent: Dec. 1, 2015

(54) TECHNIQUE OF PROCESSING NETWORK TRAFFIC THAT HAS BEEN SENT ON A TUNNEL

(75) Inventors: Attila Mihály, Dunakeszi (HU); András Császár, Budapest (HU); Lars Westberg, Enköping (SE)

(73) Assignee: Telefonaktiebolaget L M Ericsson (publ), Stockholdm (SE)

( * ) Notice: Subject to any disclaimer, the term of this patent is extended or adjusted under 35 U.S.C. 154(b) by 391 days.

(21) Appl. No.: 13/817,186

(22) PCT Filed: Aug. 17, 2010

(86) PCT No.: PCT/EP2010/005039
§ 371 (c)(1),
(2), (4) Date: Jun. 20, 2013

(87) PCT Pub. No.: WO2012/022357
PCT Pub. Date: Feb. 23, 2012

(65) Prior Publication Data
US 2013/0258963 A1    Oct. 3, 2013

(51) Int. Cl.
*H04L 12/46*    (2006.01)
*H04L 29/12*    (2006.01)
(Continued)

(52) U.S. Cl.
CPC ......... *H04W 28/065* (2013.01); *H04L 12/4633* (2013.01); *H04L 29/12367* (2013.01);
(Continued)

(58) Field of Classification Search
None
See application file for complete search history.

(56) References Cited

U.S. PATENT DOCUMENTS 8,432,871 B1 *  4/2013  Sarnaik et al. ............... 370/331
2010/0075659 A1 *  3/2010  Kim et al. ................ 455/422.1
(Continued)

OTHER PUBLICATIONS

Huawei, "Selected IP Traffic Offload for UMTS at Iu-PS", 3GPP TSG SA WG2 Meeting #75, Kyoto, Japan, TD S2-096067, Aug. 31, 2009, pp. 1-5, Work Item / Release: LIPA_SIPTO / Rel-10, XP 50397353, 3GPP.
(Continued)

*Primary Examiner* — Alex Skripnikov
*Assistant Examiner* — Calvin Hsieh
(74) *Attorney, Agent, or Firm* — Coats & Bennett, PLLC

(57) ABSTRACT

A technique of processing network traffic that is sent on a tunnel between a first tunnel and a second tunnel node in a communication network is provided. A device implementation of this technique comprises an enhanced network address translation, eNAT, component (10) comprising a first obtaining unit (14) configured to obtain an uplink data packet (26) from an uplink tunnel from the first tunnel node to the second tunnel node, the uplink data packet comprising a first network address associated with the first tunnel node, a second network address associated with the second tunnel node, a first identifier associated with the uplink tunnel an internal network address, and an internal port number, a second obtaining unit (16) configured to obtain a second identifier associated with a downlink tunnel from the second tunnel node to the first tunnel node, wherein the downlink tunnel is related to the uplink tunnel, a checking unit (18) configured to check, based on the second network address and the first identifier, whether a database entry comprising the second network address and the first identifier exists in a database (12), an updating unit (20) configured to update the database (12) in case the checked database entry does not exist in the database (12), and a manipulating unit (22) configured to manipulate the uplink data packet (26).

15 Claims, 14 Drawing Sheets

(51) Int. Cl.
H04W 28/06 (2009.01)
H04W 8/08 (2009.01)

(52) U.S. Cl.
CPC ........ *H04L29/12462* (2013.01); *H04L 61/255* (2013.01); *H04L 61/2514* (2013.01); *H04W 8/082* (2013.01)

(56) References Cited

U.S. PATENT DOCUMENTS

| | | | | |
|---|---|---|---|---|
| 2011/0058479 | A1* | 3/2011 | Chowdhury | 370/237 |
| 2011/0075675 | A1* | 3/2011 | Koodli et al. | 370/401 |
| 2011/0116499 | A1* | 5/2011 | Lim et al. | 370/355 |

OTHER PUBLICATIONS

3rd Generation Partnership Project, "Technical Specification Group Services and System Aspects; General Packet Radio Service (GPRS); Service description; Stage 2 (Release 10)", Technical Specification, 3GPP TS 23.060 V10.0.0, Jun. 10, 2010, pp. 1-303, XP 50441548, 3GPP.

3rd Generation Partnership Project, "Technical Specification Group Services and System Aspects; General Packet Radio Service (GPRS) enhancements for Evolved Universal Terrestrial Radio Access Network (E-UTRAN) access (Release 10)", Technical Specification, 3GPP TS 23.401 V10.0.0, Jun. 10, 2010, pp. 1-261, XP 50441572, 3GPP.

3rd Generation Partnership Project, "Technical Specification Group Services an System Aspects,; Local IP Access and Selected IP Access and Selected IP Traffic Offload (Release 10)", Technical Report, 3GPP 23.827 V1.1.0, May 1, 2010, pp. 1-44, XP 50441474, 3GPP.

Wikipedia, The Free Encyclopedia, "Database", Online article, Aug. 6, 2010, XP-002634399, [Retrieved on Feb. 12, 2013], Retrieved from Internet: http://en.wikipedia.org/w/index.php?title=Database&oldid=377440273.

* cited by examiner

| S-IP$_1$ | TEID-Up$_1$ | R-IP$_1$ | TEID-Dn$_1$ |
|---|---|---|---|
| S-IP$_2$ | TEID-Up$_2$ | R-IP$_2$ | TEID-Dn$_2$ |
| ... | ... | ... | ... |
| S-IP$_j$ | TEID-Up$_j$ | R-IP$_j$ | TEID-Dn$_j$ |

120

TECHNIQUE OF PROCESSING NETWORK TRAFFIC THAT HAS BEEN SENT ON A TUNNEL

TECHNICAL FIELD

The present invention generally relates to the technical field of processing network traffic. In particular, the invention relates to a technique of processing network traffic sent on a tunnel between a first tunnel node and a second tunnel node in a communication network.

BACKGROUND

FIG. 1 shows a simplified illustration of a 3$^{rd}$ Generation Partnership Project (3GPP) network architecture which is providing network access for a User Equipment (UE). In order to enable access by the UE of Internet Protocol (IP) services provided by a network operator, a Packet Data Network (PDN) connection is established via a PDN Gateway (PGW). The PGW is selected by the serving Mobility Management Entity (MME) and remains the same for the lifetime of the PDN connection. The PGW allocates an IP address for the UE and all network traffic directed to and coming from the UE is tunnelled between the UE and the selected PGW. Network traffic tunnelled via the PDN connection to the PGW may be further transmitted to the service network of the network operator or to an Autonomous System Border Router (ASBR), for example, one of the network operator's border routers constituting a peering point with other network carriers, and then further into the Internet.

Standard document 3GPP TS 22.101 V10.2.0 "3$^{rd}$ Generation Partnership Project; Technical Specification Group Services and System Aspects; Service Aspects; Service Principles (Release 10)" defines an option for macro-cellular access networks to offload selected network traffic (for example, Internet traffic) to an IP network that is located close to the UE's point of attachment to the access network. This option is known as Selected IP Traffic Offload (SIPTO). The motivation for SIPTO is to decrease the network operator's expenses, since it is often not effective to direct the network traffic to a remotely located central PGW when the network traffic may also be offloaded to a local service network or the Internet being located close to the UE's point of attachment to the access network. Thus, offload of network traffic can reduce costs of the network operator. A similar approach is known for Local IP Access (LIPA) for the home (e)NodeB subsystem.

Two alternative technical solutions for SIPTO are supported by the 3GPP standard. The first alternative is based on selection of a gateway that is close to the UE's point of attachment to the access network for specific types of network traffic. This alternative may be realized by an architectural solution that does not require significant changes of the current 3GPP network architecture. For example, the GW address may either be suggested by the Radio Access Network (RAN) node or may be Selected by enhanced Domain Name Server (DNS)-based mechanisms. The second alternative is based on network traffic breakout from the tunnels, e.g., from General Packet Radio Service (GPRS) Tunnelling Protocol (GTP) tunnels. The second alternative requires a plurality of new functions in the 3GPP network architecture.

Document 3GPP TR 23.829 V0.4.10 "3$^{rd}$ Generation Partnership Project; Technical Specification Group Services and System Aspects; Local IP Access and Selected IP Traffic Offload; (Release 10)" discloses a concept concerning offloading network traffic above the Radio Network Controller (RNC) in 3GPP communication networks. This concept is based on a logical function called Traffic Offload Function (TOF) that is located at a point within the access network where the network traffic offload is required. FIG. 2 schematically illustrates the TOF located at the Iu-PS interface of a 3GPP communication network, i.e., the interface that links the RNC with the Serving GPRS Support Node (SGSN). Network traffic is tunnelled between RNC and SGSN via uplink and downlink tunnels (not shown in FIG. 2) and can be offloaded by the TOF. For this, the TOF uses Network Address Translation (NAT). Based on the logical structure illustrated in FIG. 2, offloading of network traffic from home NodeBs can also be provided.

NAT is generally used for enabling communication of an IP host from a private network with the Internet. For this, a network device (e.g., a firewall) assigns a public IP address to the IP host. NAT is also used to limit the number of public IP addresses an organization or company uses. FIG. 3 schematically illustrates a NAT function that is enabling access of a plurality of internal clients, i.e., clients i, j, k, to the external Internet. For example, in case a client wants to contact a device on the Internet, it sends out IP packets containing addressing information that are destined for the device. When the IP packets pass the NAT function via the internal interface, the NAT function obtains information regarding the IP packet's source IP addresses (i.e., the internal IP addresses) and source Transmission Control Protocol (TCP) or User Datagram Protocol (UDP) ports (e.g., 2132). Moreover, when the IP packets pass the NAT function via the internal interface, they are modified so that after passing the external interface, they appear to be coming from the NAT function. For this modification, a mapping table is provided. The NAT function records the IP packet modifications in the mapping table so that it can reverse the modifications when IP packets returning from the Internet device arrive at the external interface of the NAT function. Thus, it is ensured that returning IP packets arriving at the external interface can pass the NAT function and are not blocked.

In the mapping table shown in FIG. 3, I-IP represents an internal IP address of the NAT function, E-IP represents an external IP address of the NAT function, I-Port represents an internal port of the NAT function, and E-Port represents an external port of the NAT function. Thus, based on the mapping table, the NAT function replaces in the data packet the source internal IP address with an external address of is the NAT function, which may have been obtained from a pool of addresses. The replacement may be I-IP$_i$→E-IP$_1$. Optionally, the source port in the data packet may be replaced with a randomly chosen, unused port of the NAT function (for example, I-Port$_x$→E-Port$_a$).

Thus, neither the client nor the Internet device is aware of the IP packet modifications provided by the NAT function. For the Internet device, the IP packets appear to be coming directly from the NAT function. In particular, the Internet device is unaware that the client even exists. When the Internet device replies to the IP packets sent by the client, they are addressed to the NAT function's external IP address (E-IP) at the translation port (E-Port$_a$). The NAT function then searches the mapping table in order to determine whether the reply IP packets match an already established connection. A match can be found in the mapping table based on the IP/port combination indicating that received IP packets belong to a connection that is initiated by a certain client, e.g., a client with the address Thereafter, the NAT function carries out modifications that reverse the modifications it has carried out on the outgoing IP packets. Thereafter, the NAT function forwards the reply IP packets to the internal client. It has to be noted that the NAT function may possess several external IP addresses to/from which mapping can be provided.

NAT of Internet Control Message Protocol (ICMP) packets may be provided in a similar manner. However, since there is no transport layer and consequently no port field in the header of ICMP packets, no source port modification is provided. Thus, two ICMP packets sent from different internal clients at the same time may be mapped incorrectly.

Moreover, with the basic NAT functions described above, various applications like File Transfer Protocol (FTP), Instant Messaging (IM), and Peer-2-Peer (P2P) applications do not work correctly from a host behind a NAT function. Since the NAT function is transparent to the host behind the NAT function, the host can communicate its internal IP address and port number in the payload (e.g., of control messages) to the external destination. However, the internal IP address and port number are invalid at the external side of the NAT function. To solve this problem, it is known to complement the NAT function with an Application Layer Gateway (ALG) which enables support of applications from behind a NAT function. For this, the ALG inspects and rewrites the IP address and port number in case this data has been found in the payload for supported application layer protocols.

NAT techniques that modify the port numbers (i.e., the transport layer header) are known as Port Address Translation (PAT) or as NAT overloading. PAT is the most common implementation of NAT. In the following description, only the generic abbreviation NAT is used for the aforementioned NAT solutions.

Document 3GPP TSG SA WG2 Meeting #76, TD S2-096667 "Offload Context Management for SIPTO and Iu-PS" discusses offload context management for SIPTO at the Iu-PS interface for the Universal Mobile Telecommunications System (UMTS). In this document, a TOF uses session offload context information for a traffic offload decision. For uplink network traffic, the TOF drags the uplink network traffic out from the GTP-U tunnel and performs NAT to offload the network traffic based on the session offload context information. At the Access Point Name (APN) level, the TOF derives a Tunnel Endpoint Identifier (TEID) from the GTP header. If the TEID is marked to be offloaded, the TOF transfers the network traffic to a defined PDN. For downlink offloaded network traffic, the TOF performs a reverse NAT function and maps network traffic to the correct bearer. For this, the TOF adds the GTP-U header with the associated TEID (which has been allocated by the RNC) and sends it to the RNC. The TOF discards returning network traffic if it cannot find a correct mapping.

When using NAT for SIPTO (as for example described in the last mentioned document), the NAT function assumes that all hosts on the local (i.e., internal) network side have a unique IP address. This is a reasonable assumption in normal network situations, since hosts having identical IP addresses cannot communicate within the local network. However, for SIPTO, there are network situations in which at least two hosts (e.g., UEs) on the local network side (i.e., below a TOF) have the same IP address so that IP address collision occurs.

For example, a plurality of PGWs may be provided in the communication network, wherein each PGW uses the same private address space coupled with the NAT function to the Internet. In this case, two UEs attached at the same access network segment (i.e., under the same TOF) but registered to different PGWs may be given the same local IP address. Moreover, for corporate APNs, a UE that is registered to a corporate Virtual Private Network (VPN) may be given a local IP address from the corporate APN that is identical to the IP address received by another UE having a different PDN connection (e.g., an Internet APN having allocated a private IP address by the PGW). In a similar manner, a PDN connection to a local service network may have an overlapping address with a PDN connection to the Internet or a corporate network. Furthermore, a roaming UE and a non-roaming UE using the same access network may be given the same IP address.

If an internal IP address collision below a NAT function occurs, the reverse mapping for downlink IP packets of two flows to different hosts is that the external addresses of both flows are replaced by the identical source internal IP addresses (cf. FIG. 3, resulting in E-IP$_a$→I-IP$_i$, E-IP$_b$→I-IP$_i$; the source ports may be replaced in that EPort$_a$→I-Port$_x$ and E-Port$_b$→Port$_y$). Therefore, the reverse mapping at the NAT function provides a correct IP address/port number combination for the IP downlink packets. However, the information regarding which host the IP downlink packets belongs gets lost. Thus, in, e.g., a 3GPP communication network, the downlink IP data packets cannot be inserted back into the correct GTP-U tunnels. Hence, a TOF using a known NAT function cannot solve the problem of internal IP address collision. Moreover, for the above examples, no technique of avoiding IP address collision below a TOF is known.

SUMMARY

Accordingly, there is a need for a technique of processing network traffic that is sent on a tunnel between a first tunnel node and a second tunnel node, which is avoiding at least some of the disadvantages outlined above.

This need is satisfied according to a first aspect by a method of processing network traffic sent on a tunnel between a first tunnel node and a second tunnel node in a communication network, the method comprising the steps carried out by an enhanced Network Address Translation (eNAT) component of obtaining an uplink data packet from an uplink tunnel from the first tunnel node to the second tunnel node, the uplink data packet comprising a first network address associated with the first tunnel node, a second network address associated with the second tunnel node, a first identifier associated with the uplink tunnel, an internal network address, and an internal port number, obtaining a second identifier associated with a downlink tunnel from the second tunnel node to the first tunnel node, wherein the downlink tunnel is related to the uplink tunnel, checking based on the second network address and the first identifier whether a database entry comprising the second network address and the first identifier exists in a database, updating the database in case the checked database entry does not exist in the database, and manipulating the uplink data packet, wherein the manipulating comprises replacing the internal network address with an external network address and replacing the internal port number with an external port number. This first aspect concerns processing of obtained network traffic before the network traffic reaches its traffic offload destination.

The eNAT component may be any kind of network component, network entity, network function, network gateway, or NAT gateway that is capable of executing a NAT function on data packets, in particular an enhanced NAT function. For example, the NAT function may be included in the TOF shown in FIG. 1. The communication network may be any kind of fixed or mobile communication network in which network traffic can be obtained, e.g., redirected, offloaded, or broken out from a tunnel (e.g., a tunnel below the IP point of presence of an UE).

The tunnel comprises at least an uplink tunnel (e.g., a tunnel from an RNC to a SGSN) and a downlink tunnel (e.g., a tunnel from a SGSN to a RNC), wherein the downlink tunnel and the uplink tunnel are related to each other, e.g., are configured to tunnel corresponding network traffic in the downlink and the uplink direction. For example, the communication network may be a network working in compliance with a 3GPP standard like UMTS or Long Term Evolution (LTE). The first and the second tunnel nodes may be any kind of network functions or entities between which a tunnel (e.g., a GTP tunnel, a Layer Two Tunneling Protocol (L2TP) tunnel, or a Pointto-Point Protocol over Ethernet (PPPoE) tunnel) can be provided. For example, one of the first and second tunnel nodes may be one of an RNC, an eNodeB, a Serving Gateway (S-GW), a SGSN, and a PDN GW. The network traffic to be processed comprises the uplink data packets and may be any kind of data that can be tunnelled and obtained from the tunnel, e.g., IP data packets, IP data flows and the like. The network traffic to be processed may further comprise downlink data packets. In particular, the processing comprises the manipulation of the uplink data packets. Moreover, the manipulating step may comprise at least one of a decapsulating of the uplink data packet, a modification of the header of the uplink data packet based on the database entry, and a routing of the uplink data packet to a traffic offload destination.

The first network address associated with the first tunnel node that is included in the uplink data packet being obtained from the uplink tunnel may be an IP address of to the first tunnel node. Similar, the second network address associated with the second tunnel node that is included in the uplink data packet may be an IP address of the second tunnel node. Furthermore, the first identifier associated with the uplink tunnel that is included in the uplink data packet may be a Tunnel Endpoint Identifier (TEID) of the uplink tunnel (UP). Moreover, the second identifier associated with the downlink tunnel may be a TEID of the downlink tunnel (DN). The first and second network address, the first identifier, the internal network address, and the internal port number may be included in the header of the uplink data packet, whereas the second identifier may not be included in the uplink data packet. In particular, the second identifier may be obtained from a database including a TEID map comprising associations between second identifiers and first network addresses. Thus, based on the first network address, the second identifier may be obtained from the database. Moreover, the database may have been generated during network attachment procedure. The second identifier may also have been obtained from one of the first tunnel node, the second tunnel node, a control node that is in charge of controlling tunnel setup during terminal attachment or mobility (e.g., a Mobile Switching Center (MSC) server or an MME), and a third party node interfacing with one of the aforementioned nodes. Further, the second identifier may be included in a first data packet of a network session or a separate network message provided to the eNAT component. The internal and external network addresses and port numbers may be network addresses and port numbers that are internal and external with regard to the eNAT component. Accordingly, the term "internal" refers to the side of the eNAT component being closer to the tunnel and the term "external" refers to the side of the eNAT component being farer away from the tunnel.

Based on the second network address and the first identifier, it is checked with a database (which may be different from the above described database) whether a database entry comprising the second network address and the first identifier exists. Depending on existence of the checked database entry, the database entry is updated. Thereby, it is ensured that an encapsulation of returning downlink data packets is possible, i.e., the returning downlink data packets can be reinserted in the correct downlink tunnel. The database to be checked may be any kind of local or remote database that allows storing and modification of various database entries, in particular, associations between data fields.

According to a further aspect, the obtained uplink data packet may have been redirected from the uplink tunnel to the eNAT component. In particular, the uplink data packet may have been redirected by a redirector component from the uplink tunnel to the eNAT component. The redirection of the network traffic and the condition for redirection may e.g. be implemented in a manner as described in aforementioned documents 3GPP TR 23.829 V0.4.10 and 3GPP TSG SA WG2 Meeting #76, TD S2-096667, which are hereby incorporated by reference in its entirety.

The step of updating the database may comprise one of sending a database entry to the database and updating a database entry in the database, wherein the database entry comprises an association between a first data field and a second data field, the first data field comprising the second network address and the first identifier, and the second data field comprising the first network address and the second identifier.

Moreover, the updating may comprise one of sending a database entry to the database and updating a database entry in the database, the database entry comprising associations between a first, a second, and a third data field, the first data field comprising the second network address, the first identifier, the internal network address and the internal port number, the second data field comprising the external network address and the external port number, and the third data field comprising the first network address, the second identifier, the internal network address and the internal port number. The database may also comprise a mapping table accessible by the eNAT component.

In order to consider a potentially modified database entry for the manipulation of the uplink data packet, the checking of the database entry step may be provided before the manipulating step.

To avoid that network traffic gets lost in case obtained network traffic cannot reach its destination, the method may comprise the further steps of sending the manipulated uplink data packet comprising in at least one of its source fields an external network address and an external port number, receiving the manipulated uplink data packet comprising in at least one of its source fields the external network address and the external port number, and checking with the database whether a database entry comprising the external network address and the external port number exists. The external network address and the external port number may be an IP address and a port number of a NAT function. Thus, when the manipulated uplink data packet is sent from the NAT function to a destination, however, cannot reach the destination, the data packet returning to the NAT function can be redirected to the correct tunnel.

To further assure redirecting the returned data packet to the correct tunnel, in case a database entry comprising the external network address and the external port number exists in the database, the method may comprise the further steps of obtaining from the database the database entries associated with the external network address and the external port number, replacing the header of the uplink data packet with the obtained database entries, and encapsulating the uplink data packet based on the second network address and the first identifier. The method may comprise the further step of routing the encapsulated data packet into the uplink tunnel.

According to a second aspect, a method of processing network traffic to be inserted in a downlink tunnel between a second tunnel node and a first tunnel node in a communication network is provided, wherein the method comprises the steps carried out by an eNAT component of obtaining a downlink data packet to be inserted in the downlink tunnel between the second tunnel node and the first tunnel node, wherein the downlink data packet comprises an external network address and an external port number, obtaining, based on the external network address and the external port number, from a database an internal network address, a first network address associated with the first tunnel node, and a second identifier associated with the downlink tunnel, replacing in the downlink data packet the external network address with the internal network address, and encapsulating the downlink data packet based on the first network address and the second identifier.

The second aspect may concern processing of redirected network traffic when the redirected network traffic returns to the eNAT component after it has reached the offload destination. Accordingly, the second aspect may supplement the first aspect. Thus, like in the first aspect, the internal and external network addresses and port numbers may be network addresses and port numbers that are internal and external with regard to the eNAT component. Moreover, based on the methods, it can be ensured that returning data packets can be reinserted in the correct tunnel.

In order to avoid processing of unidentified downlink data packets, the method may comprise the further steps of checking whether a database entry comprising the external network address and the external port number exists in the database, and discarding the downlink data packet in case no database entry comprising the external network address and the external port number exists in the database. These steps may be performed when the downlink data packet arrives at the eNAT component.

Moreover, the method may comprise the steps of obtaining from the database an internal port number, and replacing the external port number with the internal port number. These steps may also be carried out when the downlink data packet arrives at the eNAT component, thereby assuring that the correct internal port number is used for directing the downlink data packet to the correct tunnel.

According to a third aspect, a computer program product is provided. The computer program product comprises program code portions for performing one or more of the steps or one or more of the method aspects described herein, when the computer program product is executed on one or more computing devices, in particular, one or more components of a microprocessor. The computer program product may be stored on a computer-readable recording medium such as a permanent or re-writable memory, a CD-Rom, or a DVD. The computer program product may also be provided for download via one of more computer networks, such as the Internet, a cellular telecommunication network or a wireless or wired Local Area Network (LAN).

According to a fourth aspect, an eNAT component for processing network traffic sent on a tunnel between a first tunnel node and a second tunnel node in a communication network is provided, wherein the eNAT component comprises a first obtaining unit configured to obtain an uplink data packet from an uplink tunnel from the first tunnel node to the second tunnel node, the uplink data packet comprising a first network address associated with the first tunnel node, a second network address associated with the second tunnel node, a first identifier associated with the uplink tunnel, an internal network address, and an internal port number, a second obtaining unit configured to obtain a second identifier associated with a downlink tunnel from the second tunnel node to the first tunnel node, wherein the downlink tunnel is related to the uplink tunnel, a checking unit configured to check based on the second network address and the first identifier whether a database entry comprising the second network address and the first identifier exists in a database, an updating unit configured to update the database in case the checked database entry does not exist in the database, and a manipulating unit configured to manipulate the uplink data packet, wherein the manipulating comprises replacing the internal network address with an external network address and replacing the internal port number with an external port number.

According to a fifth aspect, an eNAT component for processing network traffic to be inserted in a downlink tunnel between a second tunnel node and a first tunnel node in a communication network is provided, wherein the eNAT component comprises a first obtaining unit configured to obtain a downlink data packet to be inserted in a downlink tunnel between the second tunnel node and the first tunnel node, wherein the downlink data packet comprises an external network address and an external port number, a second obtaining unit configured to obtain, based on the external network address and the external port number, from a database an internal network address, a first network address associated with the first tunnel node, and a second identifier associated with the downlink tunnel, a replacing unit configured to replace in the downlink data packet the external network address with the internal network address, and an encapsulating unit configured to encapsulate the downlink data packet based on the first network address and the second identifier.

According to a sixth aspect, a database is provided, which is configured to communicate with at least one of the aforementioned eNAT components, and to store a database entry comprising at least an association between a first data field and a second data field, the first data field comprising at least the second network address and the first identifier, and the second data field comprising at least the first network address and the second identifier. The database may also be configured to store the aforementioned associations between the first, the second and the third data fields.

According to a seventh aspect, a redirector component is provided that is in communication with at least one of the aforementioned eNAT components. The redirector component may be a part of the network node at the uplink tunnel endpoint, e.g., provided in at least one of an SGSN and an S-GW of a 3GPP communication network.

The redirector component may be configured to select at least one of the aforementioned eNAT components from a plurality of eNAT components. For example, in case redirection of network traffic from a tunnel between a first and a second tunnel node is decided, a certain eNAT component from a plurality of available eNAT components may be selected based on conditions like proximity, network offload capability, load/availability status and the like.

The redirector component may further be configured to provide an uplink data packet that has been obtained from an uplink tunnel from the first tunnel node to the second tunnel node together with a second identifier associated with the second tunnel node to the eNAT component.

Further, the redirector component may be configured to obtain the second identifier from a database, e.g., a TEID map included in the database, and send the second identifier included in a first data packet of a network session or a separate network message to the eNAT component.

BRIEF DESCRIPTION OF THE DRAWINGS

In the following, the invention will be described with reference to exemplary embodiments illustrated in the drawings, wherein.

DETAILED DESCRIPTION

In the following, for purposes of explanation and not limitation, specific details are set forth, such as particular sequences of steps, components and configurations, in order to provide a thorough understanding of the present invention. It will be apparent to one skilled in the art that the present invention may be practiced in other embodiments that depart from these specific details. For example, while the embodiments will be described with reference to 3GPP networks and specific 3GPP first and second tunnel nodes, it will be apparent to the skilled person that the invention can also be practiced in context with other communication networks and tunnel nodes. Moreover, while the embodiments will be described with reference to eNAT components, the invention can also be practiced with a TOF and a TOF comprising a redirector component and an eNAT component.

Furthermore, those skilled in the art will appreciate that the functions and processes explained herein below may be implemented using software functioning in conjunction with programmed microprocessors or general-purpose computers.

It will also be appreciated that while the embodiments are primarily described in the form of methods and apparatuses, the invention may also be embodied in a computer program product as well as in a system comprising a computer processor and a memory coupled to the processor, wherein the memory is encoded with one or more programs that may perform the functions disclosed herein.

Figure 4:
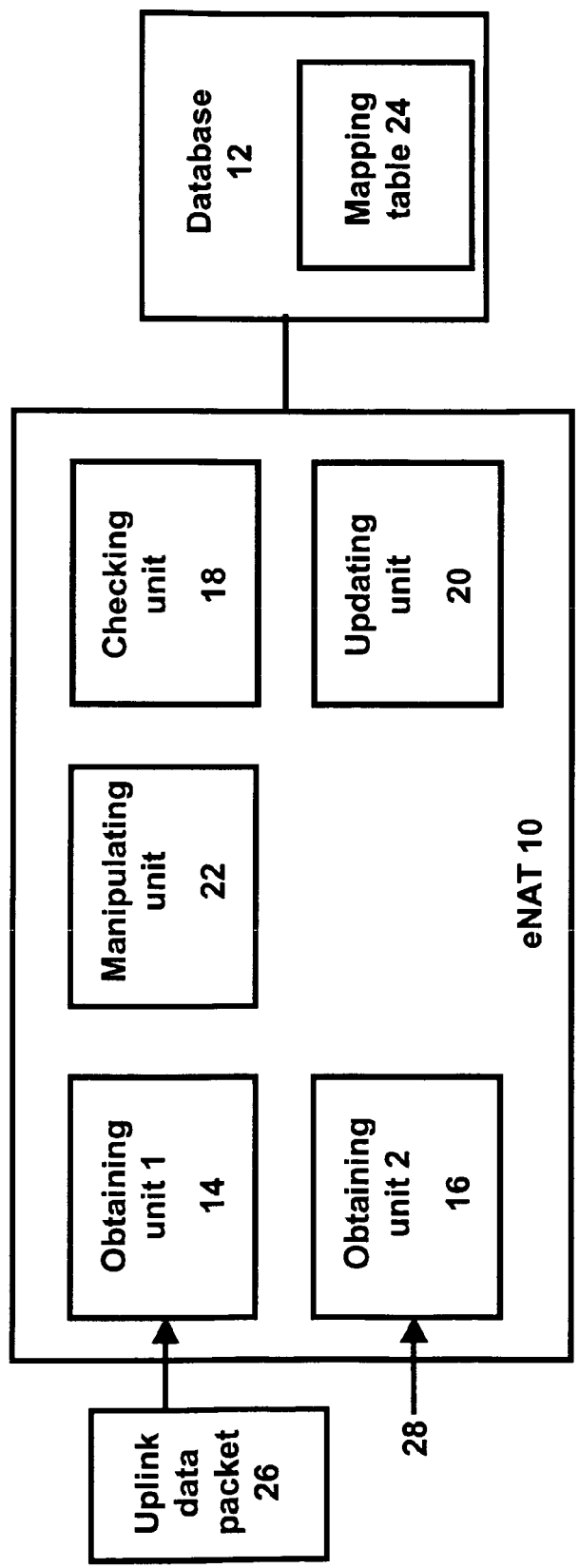
FIG. 4 is a schematic block diagram illustrating a first embodiment of an eNAT component being in communication with a database.

FIG. 4 shows a schematic block diagram illustrating an embodiment of eNAT component 10 being in communication with database 12. The eNAT component 10 may e.g. be included in TOF shown in FIG. 2, which is configured to obtain, e.g., redirect, network traffic from a tunnel between a first tunnel node (RNC) and a second tunnel node (SGSN). The eNAT component 10 may, however, also be a separate component and be in communication with a TOF or any other entity that is capable of obtaining, e.g., redirecting, network traffic from a tunnel between a first tunnel node and a second tunnel node.

Figure 2:
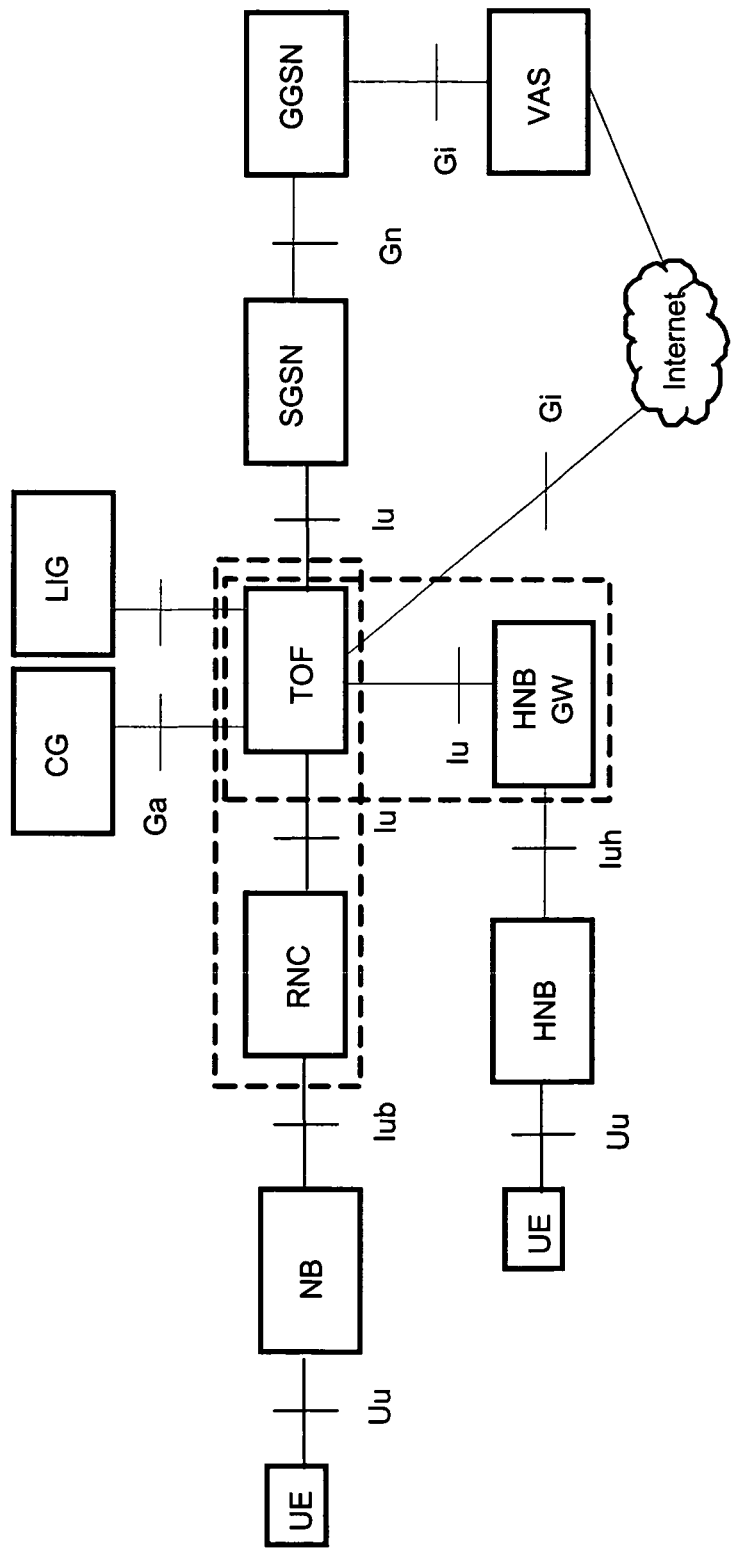
FIG. 2 is a schematic block diagram illustrating a TOF located at the Iu-PS interface of a 3GPP communication network.

The eNAT component 10 comprises a first obtaining unit 14, a second obtaining unit 16, a checking unit 18, an updating unit 20, and a manipulating unit 22. Database 12 being in communication with eNAT component 10 comprises a mapping table 24. First obtaining unit 14 is configured to obtain uplink data packet 26. Uplink data packet 26 has been redirected from an uplink tunnel from the first tunnel node to the second tunnel node. With reference to FIG. 2, data packet 26 may have been redirected from an uplink tunnel between RNC and SGSN to first obtaining unit 14. Uplink data packet 26 comprises a first network address associated with the first tunnel node, a second network address associated with the second tunnel node, a first identifier associated with the uplink tunnel, an internal network address, and an internal port number. Furthermore, second obtaining unit 16 obtains a second identifier 28 associated with a downlink tunnel from the second tunnel node to the first tunnel node, e.g., a downlink tunnel from SGSN to RNC (see FIG. 2).

Checking unit 18 checks, based on the second network address and the first identifier, whether a database entry comprising the second network address and the first identifier exists in database 12 (i.e., within mapping table 24). Updating unit 20 updates the database in case the checked database entry does not exist in database 12. Moreover, manipulating unit 22 manipulates uplink data packet 26 based on the data base entry. The manipulating comprises replacing the internal network address of eNAT component 10 with an external network address of eNAT component 10, and replacing the internal port number of eNAT component 10 with an external port number of eNAT component 10.

Figure 3:
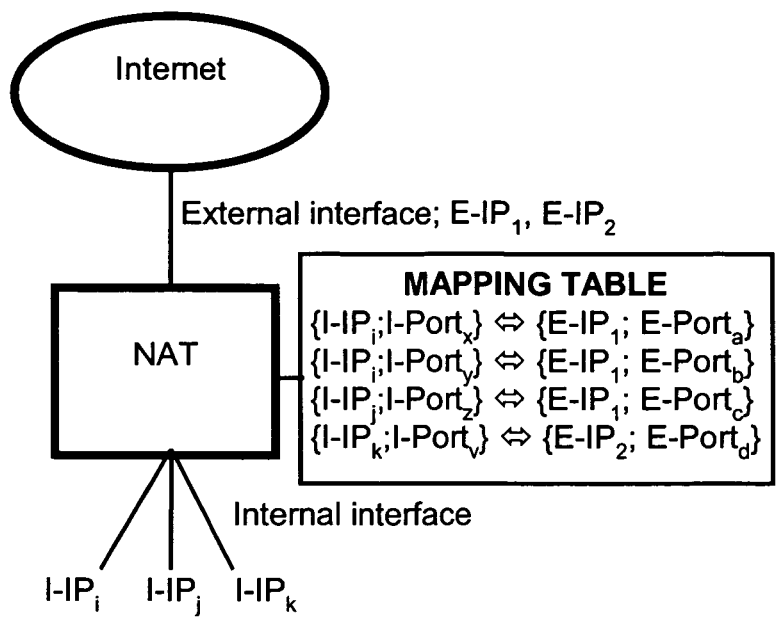
FIG. 3 is a schematic block diagram illustrating a NAT function enabling Internet access of a plurality of internal clients.
Figure 5:
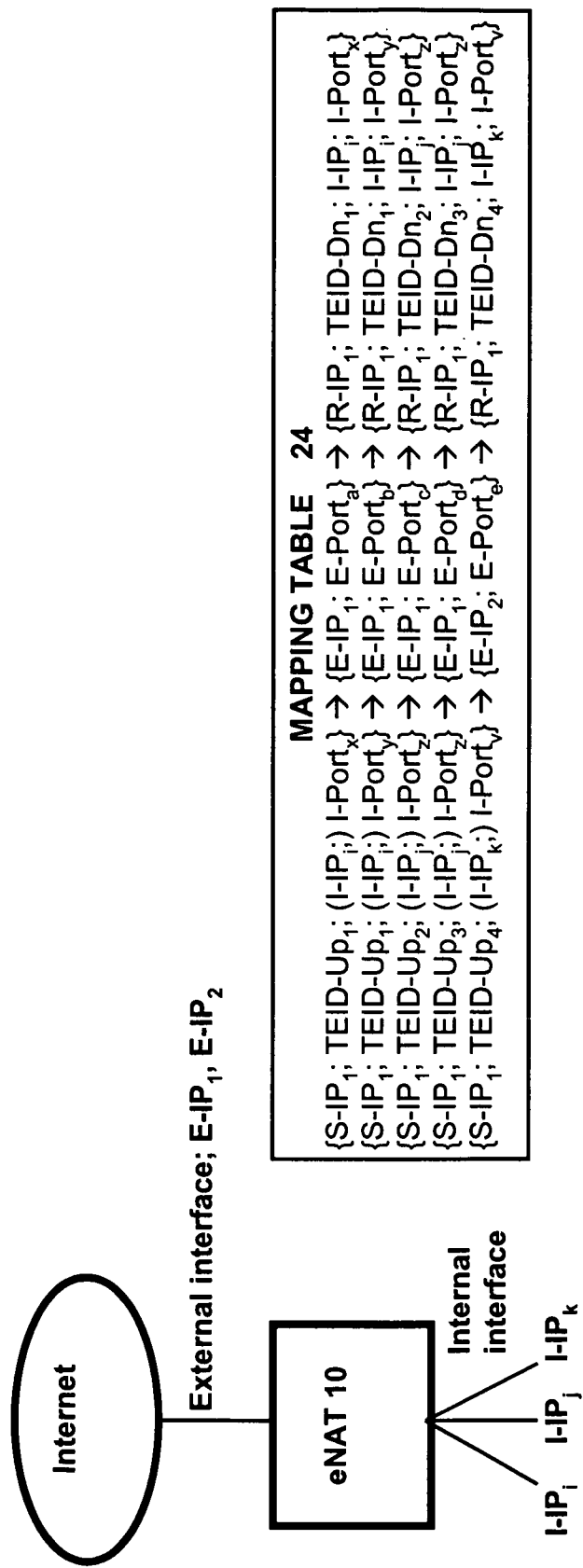
FIG. 5 is a schematic block diagram illustrating an embodiment of a mapping table.

FIG. 5 schematically illustrates an embodiment of mapping table 24 provided in database 12. FIG. 5 is based on the known NAT function of FIG. 3. The eNAT component 10 comprises an internal interface and an external interface. The internal interface is providing network connections to local clients or hosts, e.g. UEs, and the external interface is providing network connection to external devices, e.g., and Internet device. Thus, in the embodiment according to FIG. 5, "I" refers to an internal IP address and port number and "E" refers to an external IP address or port number. Moreover, S-IP represents an IP address of a second tunnel node (e.g., of an SGSN in 3GPP or of an S-GW in System Architecture Evolution SAE/LTE), R-IP represents an IP address of a first tunnel node (e.g., of an RNC in 3GPP or of a Radio Base Station (RBS) in SAE/LTE), TEID represents a tunnel endpoint identifier, respectively for the uplink and the downlink tunnel, and Port refers to respective internal and external port numbers of eNAT component 10. Moreover, "(I-IP)" in parentheses represents that this field is changing during NAT, however, it is not required for the checking. Thus, field {S-IP; TEID-Up; I-Port} unambiguously identifies a flow from a specific host and may be used for checking a database entry (cf. FIG. 4).

In 3GPP networks, GTP is used between the SGSN and the RNC as well as the SGSN and the Gateway GPRS Support Node (GGSN). Based on the incoming TEID, the SGSN selects a GTP tunnel leading to the GGSN. Moreover, based on the incoming TEID, the RNC selects the appropriate radio bearer (leading to a specific UE through the appropriate NodeB).

If a TOF comprising eNAT component 10 is deployed below the S-GW in SAE/LTE or between the SGSN and the RNC (see FIG. 2), eNAT component 10 uses the GTP TEIDs and the tunnel end-point IP addresses for the mapping in both uplink and downlink direction. The tunnel end-point IP addresses are necessary since TEIDs are allocated by the tunnel end-point node. Therefore, TEIDs are only unambiguous in the context of a tunnel end-point node. Compared to the known NAT function described with regard to FIG. 3, the forward and reverse mappings shown in mapping table 24 are not symmetrical. In particular, the fields of the downlink packets are mapped to different fields than the original fields of the uplink packets. More specifically, the TEIDs may differ in uplink and downlink direction as the allocation of the uplink TEIDs is e.g. performed by the SGSN/S-GW, while the allocation of the downlink TEID is e.g. performed by the RNC/eNodeB.

In 3GPP communication networks, user data packets are transmitted through a part of the access network encapsulated in a GTP-U tunnel. The GTP header of the user data packet (in particular, the TEID) is used in combination with the IP address of the tunnel endpoint to explicitly identify the bearer of UE. Moreover, in SAE/LTE, the S-GW and the base station use the TEID in the GTP header of the received data packet to forward the data packet to the appropriate bearer. Based on the incoming TEID, the S-GW selects a GTP or Proxy Mobile Internet Protocol (PMIP) based tunnel leading to the PGW. Based on the incoming TEID, the eNodeB selects an appropriate radio bearer leading to a specific UE. There are two alternative tunnelling possibilities between the S-GW and PGW. One is GTP tunnelling, i.e., similarly as between RBS and S-GW. The other is based on PMIP with Generic Routing Encapsulation (GRE) tunnelling. The latter is also based on per-UE tunnels, in which the identifiers are different. The technology described herein can also be used for PMIP tunnels.

Figure 6:
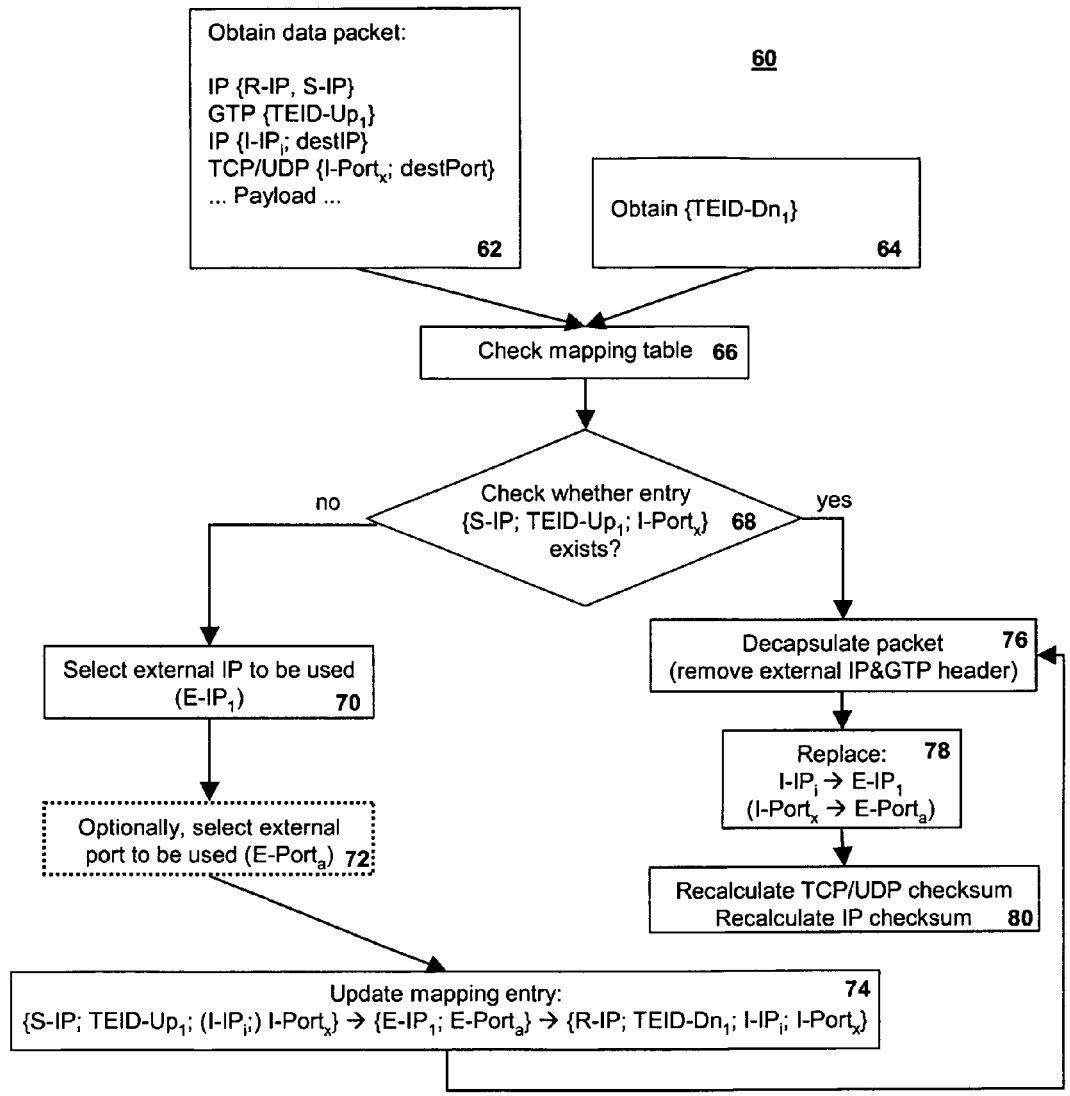
FIG. 6 is a flow chart illustrating an embodiment of a first method of processing network traffic that has been offloaded from a tunnel between a first tunnel node and a second tunnel node.

FIG. 6 is a flow chart illustrating an embodiment of a first method 60 of processing network traffic that has been off-loaded from a tunnel between a first tunnel node and a second tunnel node. Method 60 may be executed by eNAT component 10 shown in FIGS. 4 and 5, TOF shown in FIG. 2, or another network component. Method 60 will in the following be explained with reference to FIGS. 4 and 5 and a 3GPP communication network in which network traffic is tunneled via a GTP tunnel between an RNC and a SGSN (see FIG. 2).

In step 62, eNAT component 10 receives an uplink data packet 26 that has been redirected from a tunnel between first tunnel node RNC and second tunnel node SGSN. Data packet 26 has the following header structure ("dest" refers to "destination"):

IP{R-IP, S-IP}; GTP{TEID-UP$_1$}; IP{I-IP$_i$; destIP}; TCP/UDP{I-Port$_x$; destPort}; payload In step 64, eNAT component 10 further receives TEID-Dn$_1$. The eNAT component 10 may receive TEID-Dn$_1$ from at least one of a database including a TEID map, the RNC, the SGSN, a control node that is in charge of controlling tunnel setup during terminal attachment or mobility (e.g., a Mobile Switching Center (MSC) server or an MME), and a third party node interfacing with one of the aforementioned nodes.

Thereafter, in step 66, eNAT component 10 checks mapping table 24. In particular, in step 68, eNAT component 10 checks with database 12 whether a database entry for the key {S-IP; TEID-Up$_i$; I-Port$_x$} exists in mapping table 24. It has to be noted that in the known NAT function described with regard to FIG. 3, the key would only have been {I-IP$_1$; I-Port$_x$}. If no entry is found in mapping table 24, eNAT component 10 selects the external IP address to be used, e.g., E-IP$_1$ (see step 70). Optionally, in case of port translation, an unused external port value, e.g., E-Port$_a$, is selected to be used (see step 72). Port translation might not be needed if eNAT component 10 possesses a large external address pool so that each served UE can be mapped to an individual external port number.

Thereafter, in step 74, the database entry in mapping table 24 is updated as follows:

{S-IP$_1$; TEID-UP$_1$; (I-IP$_i$;) I-Port$_x$}→{E-IP$_1$; E-Port$_a$}→{R-IP; TEID-Dn$_1$; I-IP$_i$; I-Port$_x$}

Step 74 may comprise a sending of the updated database entry to database 12 or a direct updating of the database entry. Subsequently, in step 76, eNAT component 10 decapsulates data packet 26 and uses the above updated mapping information to replace the IP address (including removing the IP and GTP header) and optionally the TCP/UDP header fields of the decapsulated data packet (see step 78), which has been the inner IP header before decapsulation. Then, in step 80, the transport header and IP checksums of the data packet are recalculated and the data packet is transmitted to its destination, e.g., an Internet server. In case it is determined in checking step 76 that no database entry for key {S-IP; TEID-Up$_1$; I-Port$_x$} exists in mapping table 24, method 60 directly continues with steps 76, 78 and 80 without updating mapping table 24.

Figure 7:
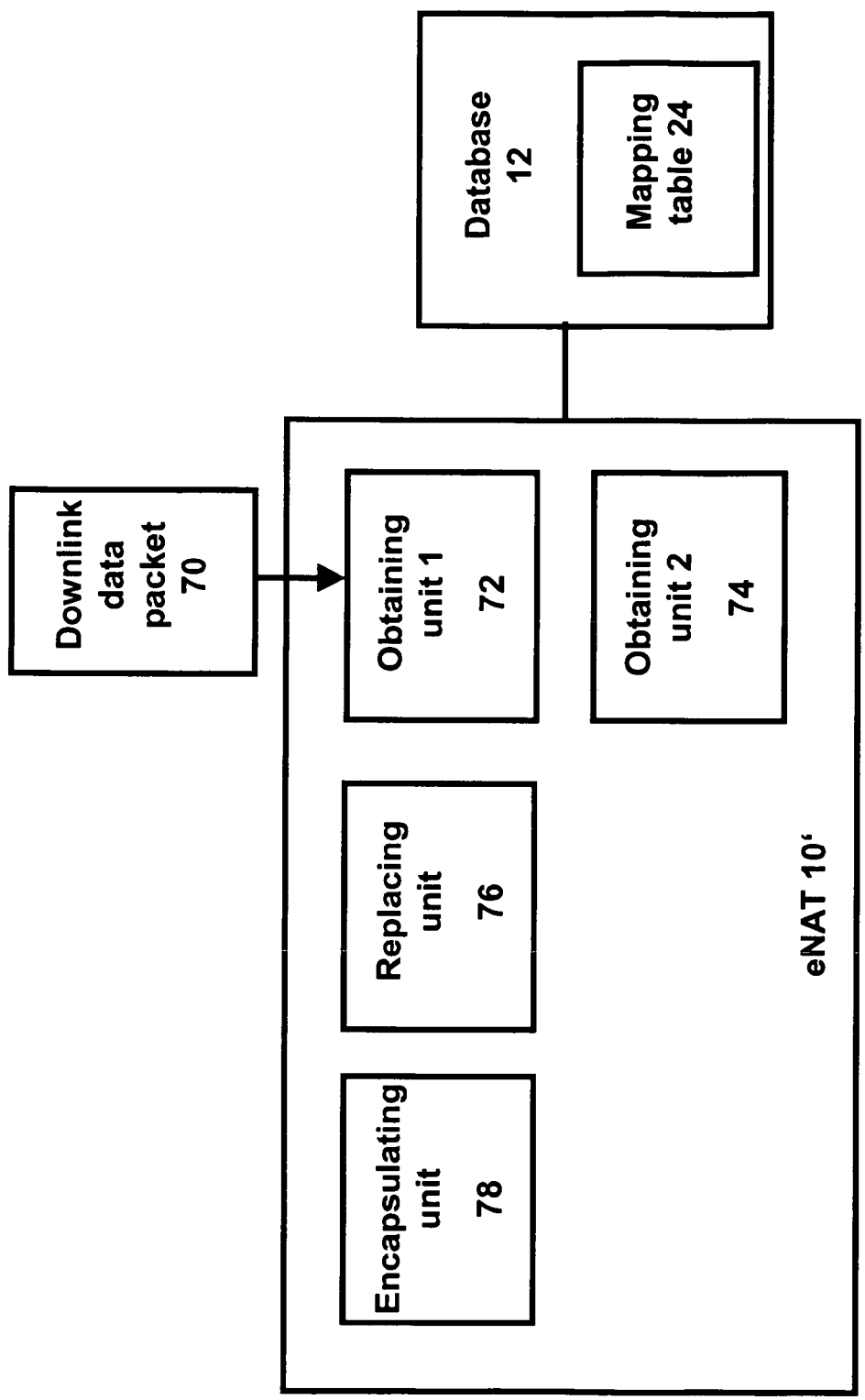
FIG. 7 is a schematic block diagram illustrating a second embodiment of an eNAT component being in communication with a database.

FIG. 7 schematically illustrates a second embodiment of an eNAT component. The eNAT component 10' may correspond to eNAT component 10 shown in FIGS. 4 and 5. Accordingly, eNAT 10' may be included in TOF shown in FIG. 2 or may be a standalone component. Similar to eNAT component 10, eNAT component 10' is in communication with database 12 comprising mapping table 24 shown in FIG. 5. In particular, the embodiment according to FIG. 7 relates to the operation of eNAT component 10' when downlink data packet 70 returns from e.g. an Internet server to eNAT component 10' and is to be reinserted in the tunnel (e.g., the GTP tunnel between RNC and SGSN shown in FIG. 2). As in the embodiment according to FIGS. 4 and 5, uplink and downlink GTP tunnels are provided between the RNC and the SGSN.

The eNAT component 10' comprises a first obtaining unit 72, a second obtaining unit 74, a replacing unit 76, and an encapsulating unit 78. First obtaining unit 72 obtains downlink data packet 70 to be inserted in the downlink tunnel between a second tunnel node (SGSN) and a first tunnel node (RNC). Downlink data packet 70 comprises in its header field at least an external network address of eNAT component 10' and an external port of eNAT component 10'. Second obtaining unit 74 obtains, based on the external network address and the external port of eNAT component 10', from database 12 (i.e., mapping table 24) and internal network address of eNAT component 10', a first address associated with the first tunnel node, and a second identifier associated with the downlink tunnel. Moreover, replacing unit 78 replaces in downlink data packet 70 the external network address of eNAT component 10' with the internal network address of eNAT component 10'.

Additionally, encapsulating unit 78 encapsulates downlink data packet 70 based on the first network address and the second identifier.

Figure 8:
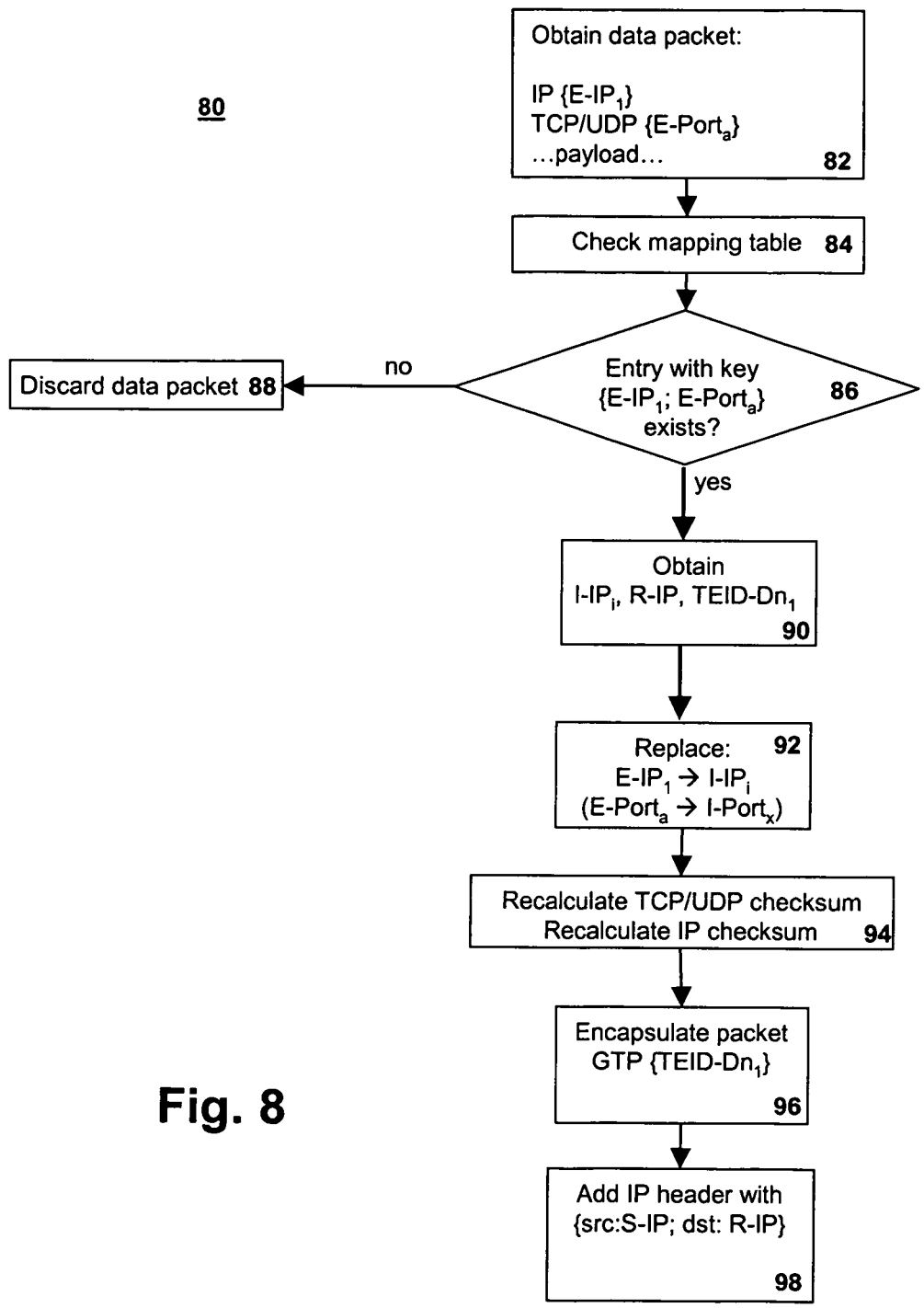
FIG. 8 is a flow chart illustrating an embodiment of a second method of processing network traffic that has been offloaded from a tunnel between a first tunnel node and a second tunnel node.

FIG. 8 is a flow chart illustrating an embodiment of a second method 80 of processing network traffic that has been offloaded from a tunnel between a first tunnel node and a second tunnel node. Method 80 may be executed by eNAT component 10' of FIG. 7, eNAT component of FIG. 5, or another network component. Method 80 will in the following be explained with reference to FIGS. 8 and 5 and a 3GPP communication network in which network traffic is tunneled via uplink and downlink GTP tunnels between RNC and SGSN (cf. FIG. 2).

In step 82, eNAT component 10' obtains downlink data packet 70 from an Internet server (not shown). Downlink data packet 70 has the following header structure:

IP {E-IP$_1$}; TCP/UDP {E-Port$_a$}; payload

Thereafter, in step 84, eNAT component 10' checks mapping table 24. In particular, in step 86, eNAT component 10' checks with database 12 whether a database entry for a key {E-IP$_1$; E-Port$_a$} exists in mapping table 24. If no such database entry exits, data packet 70 is discarded (see step 88.)

However, in case a database entry is determined to exist in step 86, based on the external network address E-IP and the external port E-Port of eNAT component 10', an internal network address of eNAT component 10' I-IP, a first network address R-IP associated with first tunnel node RNC, and a second identifier associated with the downlink tunnel TEID-Tn$_1$ is obtained in step 90 from database 12, i.e., mapping table 24. Thereafter, in step 92, the external IP address of eNAT component 10' included in data packet 70 is replaced with the internal IP address of eNAT component 10'. Optionally, the external port number of eNAT component 10' included in data packet 70 is replaced with the internal port number of eNAT component 10'.

Subsequently, in step 94, the TCP/UDP and IP checksums are recalculated. Thereafter, in steps 96 and 98, eNAT component 10' encapsulates the data packet to the GTP tunnel with the obtained TEID-Dn$_1$ and encapsulates the data packet based on the R-IP address obtained from mapping table 24, i.e., adds an IP header to data packet 70 with source (src) S-IP and destination R-IP.

In method 80, the correct downlink data packet format including the GTP encapsulation is restored by eNAT component 10'. Thus, the data packet can be directly sent out to the 3GPP access network.

Figure 9:
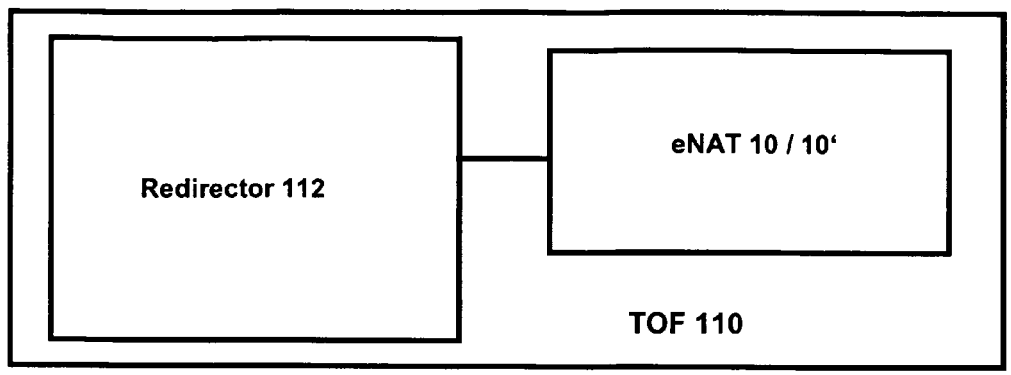
FIG. 9 is a schematic block diagram illustrating an embodiment of a TOF comprising a redirector component and an eNAT component.

FIG. 9 schematically illustrates an embodiment of a TOF 110. TOF 110 comprises a redirector component 112 and an eNAT component, i.e., eNAT component 10 of FIG. 4 and/or eNAT component 10' shown in FIG. 7. TOF 110 may e.g. be located in a 3GPP communication network between an RNC and SGSN (see FIG. 2). Redirector component 112 is configured to acquire session offload contexts, to provide network traffic offload decisions based on the session offload context, and transfer the session state to the eNAT component 10/10'. In particular, redirector component 112 is configured to redirect network traffic from a tunnel between a first and a second tunnel node to eNAT component 10/10'. Moreover, redirector component 112 is configured to reinsert returning network traffic (e.g., Internet traffic) from eNAT component 10/10' into the correct tunnel between the first and the second tunnel nodes. The eNAT component 10/10' may be located on a tunnel between two tunnel nodes or provided separate from the tunnel so that redirector component 112 redirects network traffic from the tunnel to the eNAT component 10/10' and inserts network traffic coming from the eNAT component 10/10' to the tunnel.

Figures 10, 11:
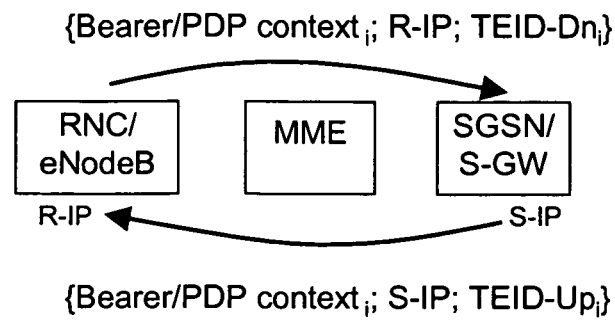
FIG. 10 is a schematic block diagram illustrating an embodiment of a method of acquiring and binding uplink and downlink tunnel IP addresses and TEIDs in 3GPP and SAE/LTE networks.
FIG. 11 is a schematic block diagram illustrating an embodiment of a TEID map.

FIG. 10 is a schematic block diagram illustrating a method of acquiring and binding uplink and downlink tunnel IP addresses and TEIDs in 3GPP and SAE/LTE networks. The method of FIG. 10 may be executed by at least one of TOF 110 and redirector component 112 of FIG. 9. For example, at least one of TOF 110 and redirector component 112 observes the Non-Access Stratum (NAS) signaling during network attachment. During this signaling phase and based on information from the MME, the SGSN/S-GW provides the RNC/eNodeB with the uplink TEID for the bearer/PDP context, which is to be used when sending the data packets in this specific bearer/PDP context towards the SGSN/S-GW. Similar, the RNC/eNodeB provides the SGSN/S-GW with the downlink TEID for bearer/PDP context which is to be used by the SGSN/S-GW so that the RNC/eNodeB is able to map the received data packets to the correct bearer. Thus, during network attachment, redirector component 112 observes the signaling, e.g., acts as proxy in the signaling process or interfaces directly to one of nodes RNC/eNode B and SGSN/S-GW.

Based on the information obtained during NAS signaling shown in FIG. 10, redirector component 112 creates TEID map 120 shown in FIG. 11. As can be seen from FIG. 11, TEID map 120 comprises associations between IP addresses and TEIDs, i.e., S-IP and TEID-Up associations and R-IP and TEID-Dn associations. TEID map 120 may be stored in a database included a redirector component 112. TEID map 120 may also be used for creating mapping table 24, e.g., when an UE initiates user plane data communication.

Figure 12:
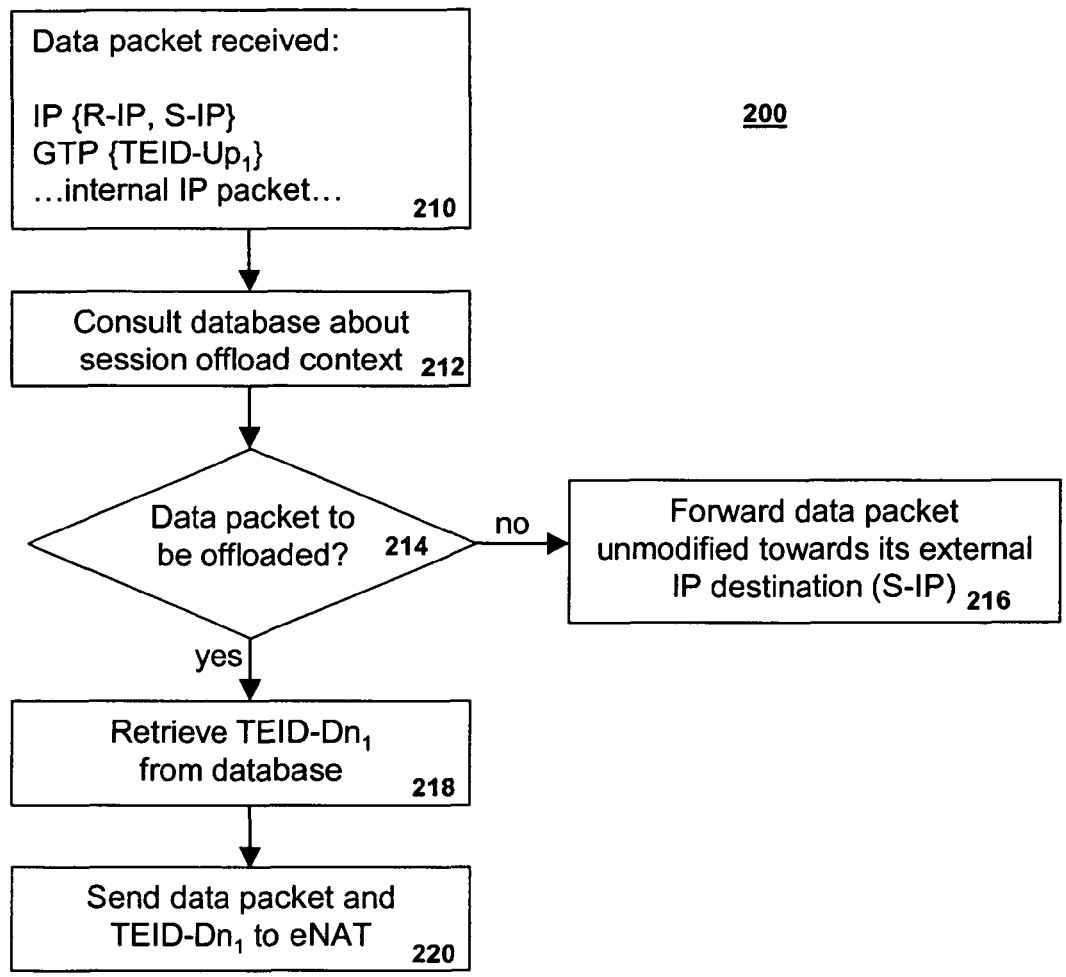
FIG. 12 is a flow chart illustrating a method embodiment of processing a data packet in a redirector component.

FIG. 12 shows a flow chart illustrating a method 200 of processing a data packet in redirector component 112 of FIG. 9. The method of FIG. 12 may be combined with the method of FIG. 10 and may use TEID map 120 of FIG. 11.

In step 210 of method 200, a data packet within the tunnel between the first and the second tunnel node passes redirector component 112. The data packet includes a header IP {R-IP, S-IP}; GTP{TEID-Up$_1$}. Thereafter, in step 212, redirector component 112 consults a database about a session offload context, i.e., decision criteria whether the data packet is to be redirected, i.e., offloaded, from the tunnel. The database comprising this session offload context may be included in redirector component 112. The redirection of the network traffic may implemented in a manner as described in aforementioned documents 3GPP TR 23.829 V0.4.10 and 3GPP TSG SA WG2 Meeting #76, TD S2-096667. Subsequently, in step 214, it is determined based on the session offload context whether the data packet is to be offloaded, i.e. redirected. In case it is determined in step 214 that the data packet is not to be offloaded from the tunnel, the data packet is forwarded in an unmodified manner towards its external IP destination S-IP (see step 216).

However, in case it is determined in step 214 that the data packet is to be off-loaded from the tunnel, redirector component 112 retrieves TEID-Dn$_1$ from TEID map 120 (see step 218). Thereafter, in step 220, the received data packet and the TEID-Dn$_1$ are sent to eNAT component 10/10', e.g., one of the eNAT components described in any of the aforementioned embodiments. Accordingly, eNAT component 10/10' may obtain from redirector component 112 the data packet and the TEID-Dn$_i$. The TEID-Dn$_1$ may be provided in a first data packet of a network session or a separate network message to the eNAT component 10/10'.

Method 200 can be implemented with pseudo-code as follows:

```
Redirector.Recv(Pkt p) {
    Bool offload=VerifyOffload(p);
    If (offload) {
        TEID teid_dn=teid_dn_lookup(p.IP.dst,p.GTP.teid);
        eNAT.RecvUp(p,teid_dn)
    }
    Else {
# normal forwarding of unmodified
# packet
        Forward(p);
    }
}
```

The above pseudo-code assumes that redirector component 112 and eNAT component 10/10' are one entity, e.g., provided in a single box. In case eNAT component 10/10' is a different remote node, an interface between redirector component 112 and eNAT component 10/10' can be provided. This interface supports transmission of the received data packet and the TEID value in the downlink direction.

In the embodiment according to FIG. 9, TOF function 110 is split into two components, i.e., redirector component 112 and eNAT component 10/10'. The eNAT component 10/10' provides the functions of identifying the flow involving tunnel information, network/port address translation, stripping the GTP header (uplink direction), restoring GTP header (downlink direction). Accordingly, redirector component 112 acquires session offload contexts, provides the traffic offload decision, and transfers session states to eNAT component 10/10'. The NAT address translation itself takes into account the bearer/tunnel identifiers. Thus, all encapsulation/decapsulation tasks, i.e., all packet manipulation tasks, can be provided by eNAT component 10/10'. This provides a high flexibility to redirector component 112. For example, redirector component 112 may select an appropriate eNAT component 10/10' from a plurality of available eNAT components.

Figure 1:
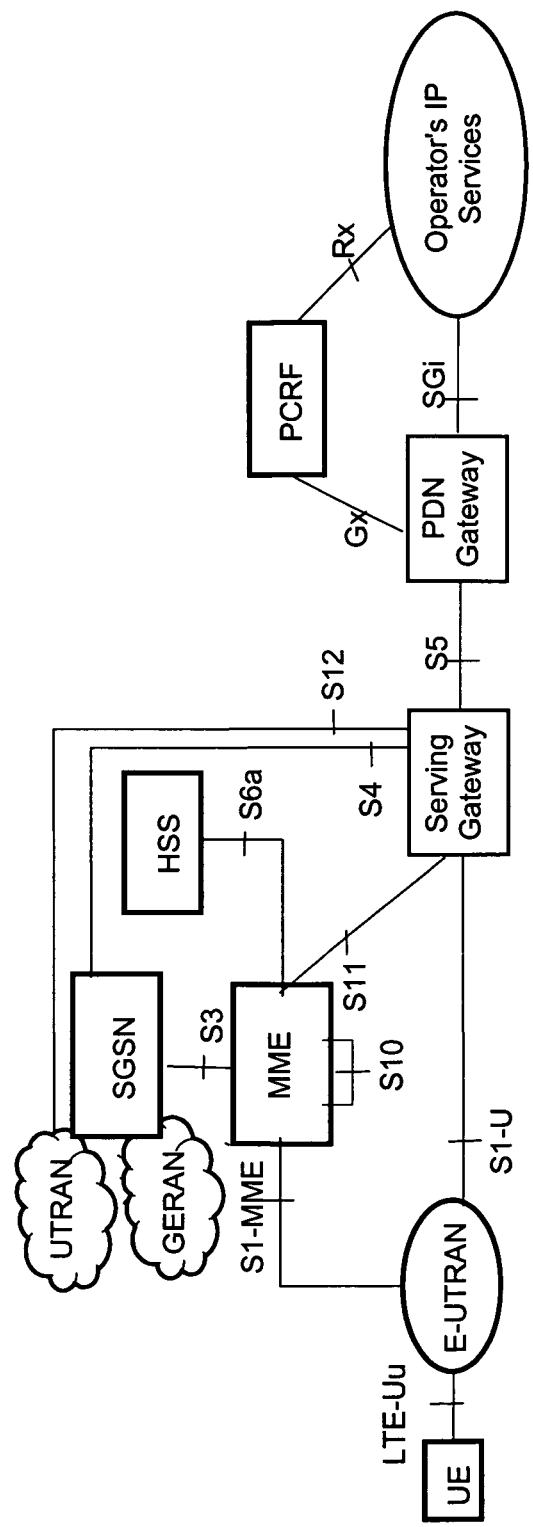
FIG. 1 is a schematic block diagram illustrating a 3GPP network architecture.

According to a further embodiment, TOF 110, while still below the GGSN/PGW (see FIGS. 1 and 2), may be deployed above the SGSN/S-GW. For example, in 3GPP/GPRS networks, the bearers between the SGSN and GGSN are processed using GTP. The above described eNAT technique is also usable in this context. Only the tunnel endpoint names have to be replaced in the above description from SGSN to GGSN (uplink tunnel end-point) and from RNC to SGSN (downlink tunnel end-point). The same applies for SAE/LTE, i.e., when the S5 interface between the S-GW and the PGW is implemented via GTP-U (as described in standard specification 3GPP TS 23.401-V9.5.0 "3rd Generation Partnership Project; Technical Specification Group Services and System Aspects; General Packet Radio Service (GPRS) enhancements for Evolved Universal Terrestrial Radio Access Network (E-UTRAN) access (Release 9)", which is hereby incorporated by reference in it entirety). Only the tunnel endpoint names have to be replaced from S-GW to PGW (uplink tunnel end-point) and from RBS or eNodeB to S-GW (downlink tunnel end-point). If PMIP is used on the S5 interface (with GRE encapsulation), the identifiers of the UE-specific GRE tunnels (the 32-bit GRE keys) are instead.

Figure 13:
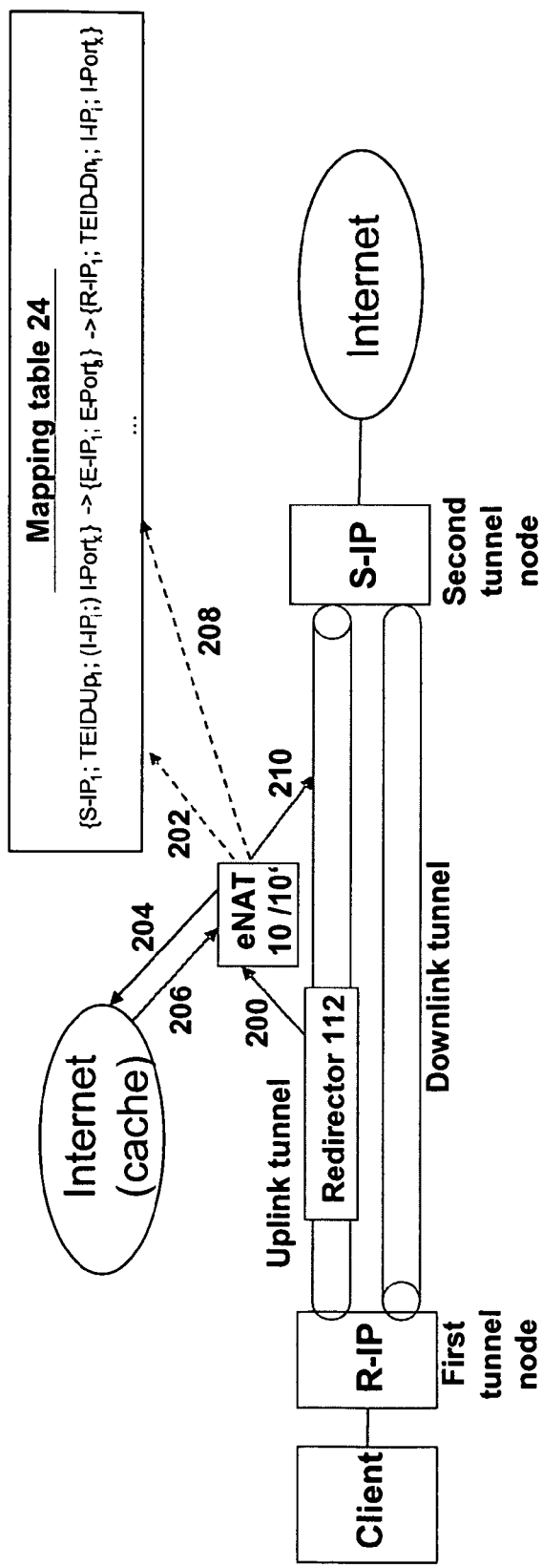
FIG. 13 is a schematic block diagram illustrating a further embodiment of a technique of processing network traffic that has been redirected from a tunnel between a first tunnel node and a second tunnel node in a communication network.

FIG. 13 schematically illustrates a further embodiment of a technique of processing network traffic that has been redirected from a tunnel between a first tunnel node and a second tunnel node in a communication network. The communications network shown in FIG. 13 may be a 3GPP network so that first tunnel node is an RNC and second tunnel node is a SGSN (cf. FIG. 2). Moreover, the redirector component, the eNAT component and the mapping table may be or may correspond to the respective components described in the above embodiments.

As can be seen from FIG. 13, an uplink tunnel is provided between the first tunnel node and the second tunnel node and a downlink tunnel is provided between the second tunnel node and the first tunnel node. If no network traffic is offloaded by redirector component 112 from the uplink tunnel, the network traffic is directed via the second tunnel node to the Internet. However, in case SIPTO is carried out, redirector component 112 redirects the data packets to eNAT component 10/10', which decapsulates the data packets and performs the NAT function based on the received tunnel information and the mapping table. The data packets received in downlink direction undergo the reverse procedure, i.e., the destination external identifiers E-IP and E-Port are replaced with the proper client identifiers and the data packet is encapsulated based on the information in mapping table 24 and sent back to the downlink tunnel. These method steps correspond to the method steps described in the aforementioned embodiments.

However, it may happen that the network traffic being off-loaded from the uplink tunnel cannot reach its destination. One reason may be that there is no IP route to a specific destination host. Another reason may be that the network traffic is offloaded in order to be served by a cache. However, it could happen that the cache does not have a given content or is overloaded, and cannot serve the request. In the aforementioned situations, it is useful if the network traffic can be reinserted into its original path (i.e., into the uplink tunnel) so that it can reach its destination (e.g., a main content server) by following the original route through the pre-established tunnels.

The eNAT component 10/10' has all necessary information for reinserting returning network traffic to the uplink tunnel. As can be seen from FIG. 13, the steps indicated by arrows 200, 202 and 204 correspond to the eNAT process of traffic offload described in the aforementioned embodiments. Thereafter, in step 206, the network traffic is rerouted back to eNAT component 10/10'. The headers of the returning data packets do not contain the E-IP and E-Port addresses in its destination fields (as it would be the case for downlink network traffic originated by the external host), however, in its source fields. Thus, eNAT component 10/10' performs additional steps. In particular, if an external data packet arrives whose destination is not recognized as a NAT address, and, if the source IP and Port numbers are found in mapping table 24 as NAT addresses (see step 208), the addresses are replaced and the data packet is encapsulated according to the first entry in mapping table 24, i.e., with S-IP and TEID-Up (see step 210). Otherwise, the data packet is discarded.

Thus, information existing in mapping table 24 is used for the reinsertion. Hence, the technique of FIG. 13 does not require any new signalling to convey extra information to eNAT component 10/10'. However, only some new functionality has to be added to eNAT component 10/10' in order to process incoming data packets with specific header information. Thus, network traffic that does not reach its destination can be reinserted to the uplink tunnel.

A further embodiment concerns redirecting of downlink traffic to eNAT component 10/10'. As has been described with regard to FIG. 13, if eNAT component 10/10' serves a cache, it is possible that the cache does not have the requested content. Thus, eNAT component 10/10' can recreate the original data packet so that it can be transmitted to its original destination. However, the caching architecture may require that the content (which will be received downstream on the regular (not offloaded) path), gets stored by the cache. Thus, there are cases that some part of the downlink network traffic has to be diverted to eNAT component 10/10'.

There are alternative procedures for implementing this diversion. According to a first procedure, when eNAT component 10/10' maps the upstream data packet back to its original tunnel (as described above), eNAT component 10/10' further informs redirector component 112 about its interest in the downstream network traffic. For this, eNAT component 10/10' sends a flow descriptor (e.g., a five-tuple descriptor) to redirector component 112. Compared to the upstream data packet, the source and destination IP and TCP/UDP fields are exchanged when receiving the downstream data packet. If redirector component 112 receives data packets matching the notified flow descriptor, it diverts the data packets to the eNAT component 10/10' and the cache. According to another procedure, redirector component 112 determines based on the O&M system the type of downstream network traffic to be redirected. For example, in case Hypertext Transfer Protocol (HTTP) caches are used, redirector component 112 can be configured to redirect all data packets with source TCP port 80 (corresponding to HTTP traffic).

Figure 14:
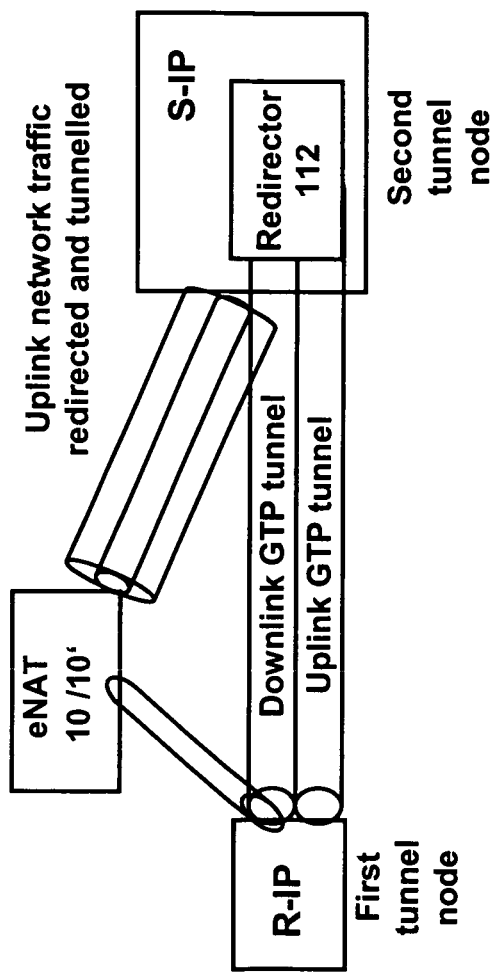
FIG. 14 schematically illustrates an embodiment of a 3GPP network having separated redirector and eNAT components.

FIG. 14 schematically illustrates an embodiment of a 3GPP network having separated redirector 112 and eNAT 10/10' components. First tunnel node is an RNC or an eNodeB and second tunnel node is an SGSN or an S-GW. If not otherwise mentioned below, redirector component 112 and eNAT component 10/10' correspond to the components as described in the aforementioned embodiments.

In the embodiment according to FIG. 14, since terminals (e.g., UEs) are mobile, redirector component 112 is located at an anchor point, i.e., the second tunnel node. Thus, if the terminals move, the data packets can still be offloaded and redirected to eNAT component 10/10'. Moreover, since the anchor point is often relatively high in the network hierarchy, downlink network traffic (which typically has higher volume than uplink network traffic) is broken as low as possible within the network in the Radio Access Network (RAN). Thereafter, the network traffic heads directly to the base stations.

For the splitting of redirector component 112 and eNAT component 10/10', eNAT component 10/10' is kept close to the first tunnel node, i.e., to reduce the path of downlink data packets entering through eNAT component 10/10'. Redirector component 112 is located at the second tunnel node. Thus, redirector component 112 is always "on-path", even for moving terminals and can obtain information about possible changes in the tunnel information for a given terminal. Thus, the same service network (e.g., the Internet) or content is reachable via either the regular connection (through the SGSN/S-GW) or via eNAT component 10/10'.

The uplink network traffic is encapsulated by the second tunnel node into a GTP tunnel leading to the second tunnel node. At the second tunnel node, redirector component 112 checks if the network traffic is to be offloaded. If offload has been determined, redirector component 112 redirects the encapsulated data packets to eNAT component 10/10'. Since eNAT component 10/10' is a remote node, the data packet is tunnelled to eNAT component 10/10' (e.g., via an IP-in-IP tunnel). Further, redirector component 112 sends the corresponding TEID entry from TEID map 120 shown in FIG. 11 to eNAT component 10/10'. The TEID entry can be sent in a separate message or can be included in the first data packet of a session sent to eNAT component 10/10'.

The eNAT component 10/10' is configured to offload and provide a NAT function on the data packet. When the eNAT component 10/10' receives a data packet from the service network (not shown in FIG. 14), it can de-eNAT it and can directly create a correctly formatted GTP-U data packet that can be sent to the first tunnel node. Thus, high speed downlink traffic can take a short path.

In the embodiment according to FIG. 14, redirector component 112 provides high flexibility since it can redirect offloaded network traffic based on a selected eNAT component 10/10', i.e., one of a plurality of available eNAT components 10/10' (not shown in FIG. 14). The selection of one of a plurality of available eNAT components 10/10' can be carried out taking at least one of the following into consideration:

The distance of the eNAT components from eNodeB/RNC. R-IP identifies the eNodeB/RNC while redirector component 112 may be aware of eNAT component locations relative to eNodeBs/RNCs. Thus, redirector component 112 may select an eNAT component closest to the source.

Offload capability: redirector component 112 may identify the specific service it offloads. Further, redirector component 112 may possess information about the capabilities of the plurality of eNAT components. For example, when offloading YouTube requests, an eNAT component in front of a cache serving YouTube videos may be selected.

Load and/or availability status of the eNAT components.

Figure 15:
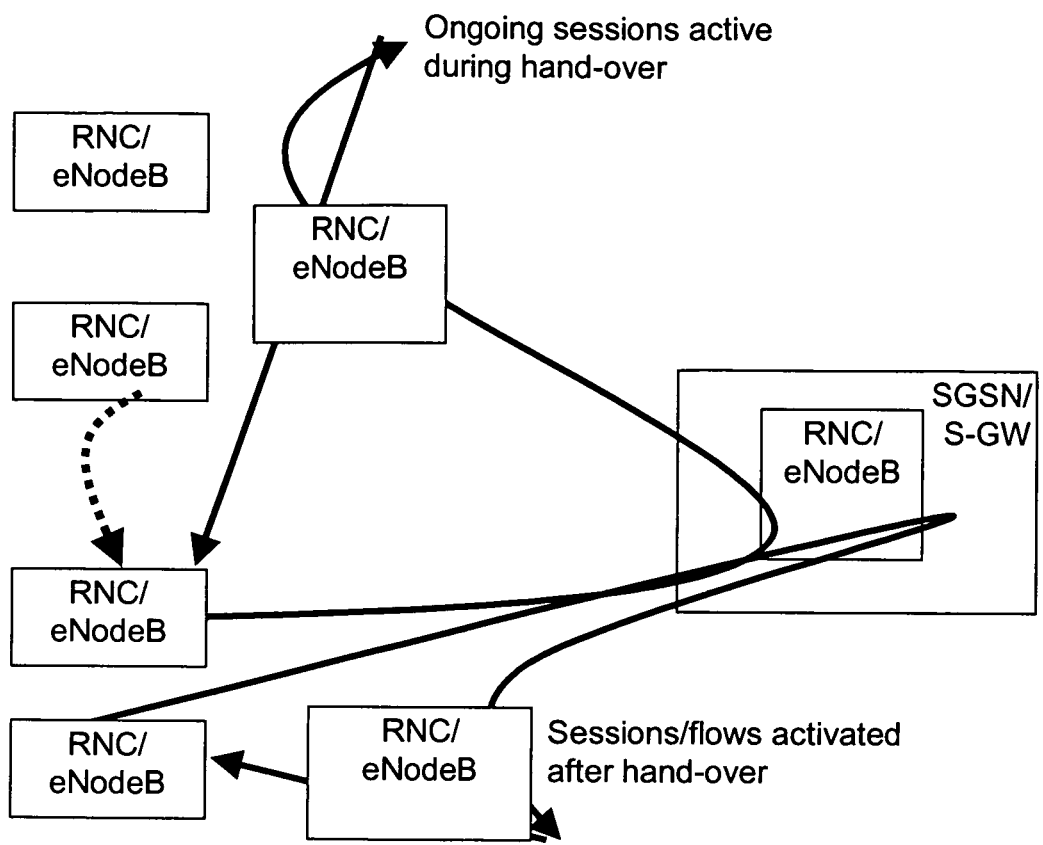
FIG. 15 is a schematic block diagram illustrating an embodiment of a mobility event in a 3GPP network in which the SGSN/S-GW is a stable anchor

The further embodiment according to FIG. 15 is based on the embodiment according to FIG. 14. The embodiment according to FIG. 15 concerns a mobility event, i.e., a handover, in which the SGSN/S-GW is assumed to be a stable anchor. This can be achieved by network configuration, e.g., by assigning a broad "service area" to the S-GW comprising a redirector component. The control nodes (MME, MSC server) comprise an intelligent S-node reselection logic ensuring that the nodes are re-allocated for specific subscribers in an optimized way, i.e., taking into account when such reallocation does not affect ongoing flows (e.g., during idle terminal mode).

If there are active sessions ongoing during the hand-over, the redirector component has to be capable to not interrupt the ongoing flow. That is, if the flow was offloaded before, the redirector component has to redirect the data packets of this flow to the same eNAT component as before. In this case, however, the eNAT component also needs to obtain the new R-IP and TEID-Dn identifiers so that it can correctly de-NAT data packets and send them to the correct new eNodeB/RNC. To achieve this, the redirector component updates the eNAT component with the new correct TEID-map entry. Thus, the redirector component sends a message containing {S-IP, TEID-Up$_{old}$}, a key to the existing entry of the eNAT component, and the updated entry {S-IP, TEID-Up$_{new}$}; {R-IP$_{new}$; TEID-Dn$_{new}$} to the eNAT component.

However, sessions/flows newly established after hand-over can be more efficiently offloaded by an eNAT component that is different from the one used before the handover. Thus, the redirector component is capable of redirecting newly established sessions to such new eNAT components. In this case, the new eNAT component can be selected based on the same considerations described with regard to the embodiment according to FIG. 14.

In case the service network is a cache (cf. FIG. 14), the cache may not have the requested content. In this case, the eNAT-cache loads the data packet with the original headers back to the tunnel from which it was received (i.e., from the redirector component at SGSN/S-GW). The redirector component takes care that GTP-U data packets received from the tunnel from an eNAT component are not attempted to be redirected again, however, are processed as if they had been received from the RNC/eNodeB. This is slightly different compared to the embodiment according to FIG. 14 in which the eNAT component can send the originally formatted data packet back. However, in the embodiment according to FIG. 15, the redirector component receives the data packet that is formatted in the same way as if it had been received by the RNC/eNodeB.

If it is desired to have the cache to obtain content items which it was not capable to serve, then downlink network traffic has to be diverted towards the eNAT-cache so that it can obtain the results. For this, the principles of the embodiment according to FIG. 14 can be used. The redirector component establishes a respective redirection rule when it receives a data packet from the eNAT component. Moreover, before forwarding the downstream packet towards its R-IP destination, the eNAT-cache replicates a copy for internal processing.

Thus, the redirector component being part of the network node at the uplink tunnel endpoint, which acts as the mobility anchor, e.g., S-GW or SGSN, immediately obtains all necessary knowledge from the network node, e.g., the SGSN/S-GW. As to the TEID map, the redirector component does not need to implement any special mechanism to obtain the mapping info (like obtaining the NAS signalling), since the SGSN/S-GW already has this information available.

While the present technique for processing network traffic has been described for a SIPTO concept on 3GPP networks, it can be used in all other cases when network traffic is broken out from a tunnel below the IP point of presence of a terminal. This may also be the case in fixed communication networks, e.g., in case of services offered for a nomadic subscriber. The situation is similar, because a nomadic subscriber may receive an IP address that is identical with the IP address of a local subscriber. In this case, the network provider has an interest to break out network traffic to the Internet as early as possible. Thus, the proposed technique can be used with the modification that instead of IP addresses/TEIDs, the identifiers of the tunnels used in the fixed network are used. If traffic is to be broken out between an L2TP Access Concentrator (LAC) and an L2TP Network Server (LNS) of an L2TP tunnel, the identifiers are the IP addresses of the endpoints together with the session IDs of the tunnels. Furthermore, if network traffic is to be broken out even closer, i.e., between the LAC and the Access Node (DSLAM), the session ID of the PPPoE tunnel can be used. Instead of IP addresses, the MAC addresses of the endpoints can be used as identifiers.

The present technique for processing network traffic that has been offloaded from a tunnel between two tunnel nodes avoids internal IP address collision when at least two terminals have been assigned the same IP address. For this, the technique may comprise the following features:
  pre-configuring network traffic offload policies;
  acquiring tunnel identifiers (for both the uplink and downlink direction) for the hosts or sessions to be offloaded during terminal attachment procedure;
  performing an offload decision for received packets;
  selecting an optimal eNAT component to redirect network traffic to;
  redirecting uplink and potentially also downlink traffic to the selected eNAT component;
  setting up eNAT mapping tables for the network traffic to be offloaded that include the tunnel identifiers besides the usual IP address-port pairs in order to identify the respective tunnels;
  modifying existing entries in the eNAT mapping tables in case of terminal mobility by modifying the tunnel and IP address identifiers based on the parameters of the new tunnel;
  performing break-out for uplink tunnelled traffic using the eNAT component incorporating flow identification based on the enhanced mapping table and including stripping the GTP header;
  performing break-in to the downlink tunnel for downlink external network traffic using the eNAT component incorporating encapsulation with correct GTP headers relying on the eNAT mapping table; and
  performing break-in to the uplink tunnel for re-routed external network traffic using the eNAT component incorporating encapsulation with correct GTP headers relying on the eNAT mapping table.

It is believed that many advantages of the present invention will be fully understood from the foregoing description, and it will be apparent that various changes may be made in the form, construction and arrangement of the exemplary aspects thereof without departing from the scope of the invention or without sacrificing all of its advantages. Because the invention can be varied in many ways, it will be recognized that the invention should be limited only by the scope of the following claims.

The invention claimed is:

1. A method of processing network traffic sent on a General Packet Radio Service Tunnelling Protocol (GTP) tunnel or a Proxy Mobile Internet Protocol (PMIP) tunnel between a first tunnel node and a second tunnel node in a communication network, the communication network comprising a Traffic Offload Function (TOF) including a redirector component and one or more enhanced Network Address Translation (eNAT) components in communication with each other, the method comprising:
  obtaining, by the redirector component, an uplink data packet from an uplink tunnel from the first tunnel node to the second tunnel node, the uplink data packet comprising:
    a first network address associated with the first tunnel node;
    a second network address associated with the second tunnel node;
    a first identifier associated with the uplink tunnel;
    an internal network address; and
    an internal port number;
  obtaining, by the redirector component, a second identifier associated with a downlink tunnel from the second tunnel node to the first tunnel node, wherein the downlink tunnel is related to the uplink tunnel; and
  selecting, by the redirector component, an eNAT component from the one or more eNAT components;
  obtaining, by the selected eNAT component, the uplink data packet from the redirector component;
  obtaining, by the selected eNAT component, the second identifier from the redirector component;
  checking, by the selected eNAT component and based on the second network address and the first identifier, whether a database entry comprising the second network address and the first identifier exists in a database in communication with the selected eNAT component;
  updating, by the selected eNAT component, the database in response to the checked database entry not existing in the database; and
  manipulating, by the selected eNAT component, the uplink data packet by:
    replacing the internal network address with an external network address, wherein the internal network address and the external network address are internal and external with regard to the selected eNAT component, respectively; and replacing the internal port number with an external port number, wherein the internal port number and the external port number are internal and external with regard to the selected eNAT component, respectively.

2. The method of claim 1, wherein the uplink data packet obtained by the selected eNAT component has been redirected from the uplink tunnel to the selected eNAT component.

3. The method of claim 1, wherein updating, by the selected eNAT component, the database comprises:
sending, by the selected eNAT component, a database entry update to the database or updating an existing database entry in the database;
the updated database entry comprising an association between a first data field and a second data field;
the first data field comprising the second network address and the first identifier; and
the second data field comprising the first network address and the second identifier.

4. The method of claim 1, wherein updating, by the selected eNAT component, the database comprises:
sending, by the selected eNAT component, a database entry update to the database or updating an existing database entry in the database;
the updated database entry comprising associations between first, second, and third data fields;
the first data field comprising the second network address, the first identifier, the internal network address, and the internal port number;
the second data field comprising the external network address and the external port number; and
the third data field comprising the first network address, the second identifier, the internal network address, and the internal port number.

5. The method of claim 1, further comprising:
sending, by the selected eNAT component, the manipulated uplink data packet, the uplink data comprising the external network address and the external port number in at least one of its source fields;
receiving, by the selected eNAT component, the manipulated uplink data packet; and
checking, by the selected eNAT component, whether a database entry comprising the external network address and the external port number exists in the database.

6. The method of claim 5, wherein in response to the database entry comprising the external network address and the external port number existing in the database, the method further comprises:
obtaining, by the selected eNAT component, database entries associated with the external network address and the external port number from the database;
replacing, by the selected eNAT component, the header of the uplink data packet with the obtained database entries; and
encapsulating, by the selected eNAT component, the uplink data packet based on the second network address and the first identifier.

7. The method of claim 1, further comprising:
obtaining, by the selected eNAT component, a downlink data packet to be inserted in the downlink tunnel between the second tunnel node and the first tunnel node, wherein the downlink data packet comprises the external network address and the external port number;
obtaining, by the selected eNAT component, from the database, and based on the external network address and the external port number:
the internal network address;
the first network address associated with the first tunnel node; and
the second identifier associated with the downlink tunnel;
replacing, by the selected eNAT component and in the downlink data packet, the external network address with the internal network address; and
encapsulating, by the selected eNAT component, the downlink data packet based on the first network address and the second identifier.

8. The method of claim 7, further comprising:
checking, by the selected eNAT component, whether a database entry comprising the external network address and the external port number exists in the database; and
discarding, by the selected eNAT component, the downlink data packet in response to no database entry comprising the external network address and the external port number existing in the database.

9. The method of claim 7, further comprising:
obtaining, by the selected eNAT component, from the database the internal port number; and
replacing, by the selected eNAT component, the external port number with the obtained internal port number.

10. The method of claim 1, wherein:
the communication network comprises a 3rd Generation Partnership Project (3GPP) network;
the first tunnel node comprises one of a Radio Network Controller (RNC), an eNodeB, and a Serving Gateway (S-GW);
the second tunnel node comprises one of a Serving GPRS Support Node (SGSN), a Serving Gateway (S-GW), and a Packet Data Network Gateway (PDN GW);
the first network address comprises an Internet Protocol (IP) address of the first tunnel node; and
the second identifier comprises a Tunnel Endpoint Identifier of a downlink GPRS tunnelling protocol (GTP) tunnel.

11. The method of claim 1, wherein obtaining, by the redirector component, the second identifier comprises obtaining the second identifier from one of:
the database;
the first tunnel node;
the second tunnel node;
a control node in charge of controlling tunnel setup during terminal attachment or mobility; and
a third party node interfacing with at least one of the aforementioned nodes.

12. A computer program product stored in a non-transitory computer readable medium for controlling a Traffic Offload Function (TOF) of a communication network, wherein network traffic is sent on a General Packet Radio Service Tunneling Protocol (GTP) tunnel or a Proxy Mobile Internet Protocol (PMIP) tunnel between a first tunnel node and a second tunnel node in the communication network, and wherein the TOF includes a redirector component and one or more enhanced Network Address Translation (eNAT) components, the computer program product including program code portions which, when run on a processor of the redirector component, cause the redirector component to:
obtain an uplink data packet from an uplink tunnel from the first tunnel node to the second tunnel node, the uplink data packet comprising:

a first network address associated with the first tunnel node;
  a second network address associated with the second tunnel node;
  a first identifier associated with the uplink tunnel;
  an internal network address; and
  an internal port number;
 obtain a second identifier associated with a downlink tunnel from the second tunnel node to the first tunnel node, wherein the downlink tunnel is related to the uplink tunnel; and
 select an eNAT component from the one or more eNAT components; and
the computer program product further comprising program code portions which, when run on a processor in the selected eNAT component, cause the selected eNAT component to:
 obtain the uplink data packet from the redirector component;
 obtain the second identifier from the redirector component;
 check, based on the second network address and the first identifier, whether a database entry comprising the second network address and the first identifier exists in a database in communication with the selected eNAT component;
 update the database in response to the checked database entry not existing in the database; and
 manipulate the uplink data packet by:
  replacing the internal network address with an external network address, wherein the internal network address and the external network address are internal and external with regard to the selected eNAT component, respectively; and
  replacing the internal port number with an external port number, wherein the internal port number and the external port number are internal and external with regard to the selected eNAT component, respectively.

13. A Traffic Offload Function (TOF) configured to process network traffic sent on a General Packet Radio Service Tunnelling Protocol (GTP) tunnel or a Proxy Mobile Internet Protocol (PMIP) tunnel between a first tunnel node and a second tunnel node in a communication network, the TOF comprising:
 a redirector circuit and one or more enhanced Network Address Translation (eNAT) circuits in communication with each other;
 wherein the redirector circuit is configured to:
  obtain an uplink data packet from an uplink tunnel from the first tunnel node to the second tunnel node, the uplink data packet comprising:
   a first network address associated with the first tunnel node;
   a second network address associated with the second tunnel node;
   a first identifier associated with the uplink tunnel;
   an internal network address; and
   an internal port number;
  obtain a second identifier associated with a downlink tunnel from the second tunnel node to the first tunnel node, wherein the downlink tunnel is related to the uplink tunnel;
  select one of the one or more eNAT circuits;
 wherein the selected eNAT circuit comprises:
  a first obtainer circuit configured to obtain the uplink data packet from the redirector circuit;
  a second obtainer circuit configured to obtain the second identifier from the redirector circuit;
  a checker circuit configured to check based on the second network address and the first identifier whether a database entry comprising the second network address and the first identifier exists in a database;
  an updater circuit configured to update the database in case the checked database entry does not exist in the database; and
  a manipulator circuit configured to manipulate the uplink data packet by:
   replacing the internal network address with an external network address,
   wherein the internal network address and the external network address are internal and external with regard to the selected eNAT circuit, respectively; and
   replacing the internal port number with an external port number, wherein the internal port number and the external port number are internal and external with regard to the selected eNAT circuit, respectively.

14. The TOF according to claim 13, wherein the redirector circuit is further configured to provide the uplink data packet together with the second identifier to the selected eNAT circuit.

15. The TOF according to claim 14, wherein the redirector circuit is further configured to:
 obtain the second identifier from a Tunnel Endpoint Identifier (TEID) map comprising associations between IP addresses and TEIDs; and
 send the second identifier included in a first data packet of a network session or a separate network message to the selected eNAT circuit.

* * * * *

UNITED STATES PATENT AND TRADEMARK OFFICE
CERTIFICATE OF CORRECTION

PATENT NO. : 9,204,336 B2
APPLICATION NO. : 13/817186
DATED : December 1, 2015
INVENTOR(S) : Mihály et al.

It is certified that error appears in the above-identified patent and that said Letters Patent is hereby corrected as shown below:

On the Title Page, in Item (73), under "Assignee", in Column 1, Line 2, delete "Stockholdm" and insert -- Stockholm --, therefor.

On the Title Page, in Item (57), under "ABSTRACT", in Column 1, Line 5, delete "eNAT," and insert -- eNAT --, therefor.

In Column 2, Line 45, delete "of is" and insert -- of --, therefor.

In Column 2, Line 64, delete "address" and insert -- address I-IP$_1$. --, therefor.

In Column 4, Lines 13-14, delete "EPort$_a$→I-Port$_x$ and E-Port$_b$→Port$_y$)." and insert -- E-Port$_a$→I-Port$_x$ and E-Port$_b$→I-Port$_Y$). --, therefor.

In Column 5, Line 10, delete "Pointto-Point" and insert -- Point-to-Point --, therefor.

In Column 5, Line 27, delete "of to" and insert -- of --, therefor.

In Column 8, Line 39, delete "cornmunication" and insert -- communication --, therefor.

In Column 12, Line 7, delete "TEID-Up$_i$;" and insert -- TEID-Up$_1$; --, therefor.

In Column 12, Line 65, delete "replacing unit 78" and insert -- replacing unit 76 --, therefor.

In Column 14, Line 64, delete "TEID-Dn$_i$." and insert -- TEID-Dn$_1$. --, therefor.

Signed and Sealed this
Thirty-first Day of May, 2016

Michelle K. Lee
*Director of the United States Patent and Trademark Office*